United States Patent [19]

Caulk, Jr.

[11] Patent Number: 5,742,780

[45] Date of Patent: Apr. 21, 1998

[54] DUAL PIPELINE SUPERSCALAR REDUCED INSTRUCTION SET COMPUTER SYSTEM ARCHITECTURE

[75] Inventor: Robert L. Caulk, Jr., Livermore, Calif.

[73] Assignee: LSI Logic Corporation, Calif.

[21] Appl. No.: 783,810

[22] Filed: Jan. 16, 1997

Related U.S. Application Data

[63] Continuation of Ser. No. 540,336, Oct. 6, 1995, Pat. No. 5,603,047.

[51] Int. Cl.$^6$ .................................................. G06F 9/30
[52] U.S. Cl. .................................................. 395/382
[58] Field of Search ................ 364/DIG. 1 MS File, 364/DIG. 2 MS File; 395/376, 388, 381, 382, 449, 384, 556, 391, 800.01, 800.23, 800.24, 800.41

[56] References Cited

U.S. PATENT DOCUMENTS

| | | | |
|---|---|---|---|
| 5,193,206 | 3/1993 | Mills | 395/800 |
| 5,430,851 | 7/1995 | Hirata et al. | 395/388 |
| 5,440,749 | 8/1995 | Moore et al. | 395/800 |
| 5,471,598 | 11/1995 | Quattromani et al. | 395/449 |
| 5,530,890 | 6/1996 | Moore et al. | 395/800 |
| 5,537,581 | 7/1996 | Conary et al. | 395/556 |

*Primary Examiner*—Robert B. Harrell
*Attorney, Agent, or Firm*—Townsend and Townsend and Crew LLP; Henry K. Woodward

[57] ABSTRACT

A microprocessor core operating on instructions in a dual six-stage pipeline. Instructions are fetched and decoded by an instruction scheduling unit which includes a queuing stage for facilitating conditional branch operations. Instructions can be executed in five execution units including a load/store/add unit, an ALU unit, a shift/multiply unit, a branch unit, and a coprocessor which interfaces with the microprocessor core. Exceptions are handled by the coprocessor which includes a plurality of registers and a multiple entry translation lookaside buffer and an exception program counter. When an exception is detected the coprocessor loads the exception program counter with a restart address where execution can resume after the exception is serviced, the plurality of registers being used during the exception processing. One of the registers is a circulate mask register which is used by the coprocessor in executing an Add with Circular Mask instruction in which an immediate field of the instruction is sign-extended and added to the contents of a general register, the result being masked with the extended value in the circular mask register.

12 Claims, 16 Drawing Sheets

| Status Register (R3000 Mode) | | | | | | | | | | | | | | |
|---|---|---|---|---|---|---|---|---|---|---|---|---|---|---|
| 31 | 27 | 22 | 21 | 20 | 19 | 15 | 9 | 7 | 6 | 5 | 4 | 3 | 2 | 1 0 |
| Cu [3:0] | 0 | BEV | 0 | SR | 0 | Int [5:0] | Sw [1:0] | 0 | | KUo | IEo | KUp | IEp | KUc IEc |
| 4 | 5 | 1 | 1 | 1 | 4 | 6 | 2 | 2 | | 1 | 1 | 1 | 1 | 1 1 |

Cu: Controls the usability of the four coprocessors (1 -> usable, 0 -> unusable).
BEV: Controls location of TLB refill and general exception vectors (0 -> normal, 1 -> bootstrap).
SR: Indicates a 'soft' reset has occurred.
Int: Hardware interrupt mask (0 ->, 1 -> enabled).
Sw: Software interrupt mask (0 -> disabled, 1 -> enabled).
KUo: Kernel/User Mode "old" (0 -> Kernel, 1 -> User).
IEo: Interrupt Enable "old" (0 -> disabled, 1 -> enabled).
KUp: Kernel/User Mode "previous" (0 -> Kernel, 1 -> User).
IEp: Interrupt Enable "previous" (0 -> disabled, 1 -> enabled).
KUc: Kernel/User Mode "current" (0 -> Kernel, 1 -> User).
IEc: Interrupt Enable "current" (0 -> disabled, 1 -> enabled).

FIG. 20

| Cause Register | | | | | | | |
|---|---|---|---|---|---|---|---|
| 31 | 30 | 29 | 27 | 15 | 8 | 7 6 | 2 0 |
| BD | BT | CE [1:0] | 0 | IP [7:0] | 0 | ExcCode [4:0] | 0 |
| 1 | 1 | 2 | 12 | 8 | | 5 | 2 |

BD: Indicates whether or not the last exception was taken while executing in a branch delay slot (1 -> delay slot, 0 -> normal).
BT: When the BD bit is set, this field indicates that the branch was taken.
CE: Indicates the coprocessor unit number referenced when a Coprocessor Unusable exception is taken.
IP: Indicates whether an interrupt is pending.
ExcCode: This is the exception code field (defined in Table 8 below).

FIG. 21

| CCC Register | | | | | | | | | | | | | | | | | | | | | | | | |
|---|---|---|---|---|---|---|---|---|---|---|---|---|---|---|---|---|---|---|---|---|---|---|---|---|
| 31  25 | 24 | 23 | 22 | 21 | 20 | 19 | 18 | 17 | 16 | 15 14 | 13 | 12 | 11 10 | 9 | 8 7 | 6 | 5 | 4 | 3 | 2 | 1 | 0 | | |
| 0 | EVI | CMP | IIE | DIE | MUL | MAD | TMR | BGE | IE0 | IE1 | IS[1:0] | DE0 | DE1 | DS[1:0] | IPWE | IPWS[1:0] | TE | WB | SR0 | SR1 | IsC | TAG | INV |
| 6 | 1 | 1 | 1 | 1 | 1 | 1 | 1 | 1 | 1 | 1 | 2 | 1 | 1 | 2 | 1 | 2 | 1 | 1 | 1 | 1 | 1 | 1 | 1 |

EVI: External Vectored Interrupt Enable (0 -> disable, 1 -> enable)
CMP: R3000 Compatibility Mode (0 -> disable, 1 -> enable).
IIE: I-Cache Invalidate Request Enable (0 -> disable, 1 -> enable).
DIE: D-Cache Invalidate Request Enable (0 -> disable, 1 -> enable).
MUL: Hardware Multiplier Enable
MAD: Multiplier Supports Accumulate Extensions (MUL must be set).
TMR: Timer Facility Enable (Count=Compare-> IP[7])
BGE: BIU Bus Grant Enable (0 -> ignore ext bus master, 1 -> enable)
IE0: I-Cache Enable Set 0.
IE1: I-Cache Enable Set 1
IS: I-Cache Set Size (00 -> 1K, 01 -> 2K, 10 -> 4K, 11 -> 8K).
DE0: D-Cache Enable Set 0>
DE1: D-Cache Enable Set 1.
DS: D-Cache Set Size (00 -> 1K, 01 -> 2K, 10 -> 4K, 11 -> 8K).
IPWE: In Page Write Enable.
IPWS: In Page Write Size (00 -> 1K, 01 -> 2K, 10 ->4K, 11 -> 8K).
TE: TLB Enable.
WB: Defines cache operation for addresses not mapped by the TLB
(0 -> writethru, 1 -> writeback).
SR0: Scratchpad RAM mode enable (D -Cache set 0).
SR1: Scratchpad RAM mode enable (D -Cache set 1).
IsC: Isolate cache mode (stores not propagated to external memory).
TAG: Tag Test mode (cache maintenance).
INV: Cache Invalidate mode (cache maintenance).

FIG. 24

| The LLAddr Register | | |
|---|---|---|
| 31 | | 1    0 |
| PAddr<31:2> | | 0 |
| 30 | | 2 |

FIG. 25

```
31      26 25    21 20    16 15                          0
┌────────┬────────┬────────┬───────────────────────────┐
│   op   │   rs   │   rt   │         immediate         │
└────────┴────────┴────────┴───────────────────────────┘

31      26 25                                            0
┌────────┬──────────────────────────────────────────────┐
│   op   │                   target                     │
└────────┴──────────────────────────────────────────────┘

31      26 25   21 20   16 15   11 10    6 5            0
┌────────┬───────┬───────┬───────┬────────┬─────────────┐
│   op   │  rs   │  rt   │  rd   │ shamt  │    funct    │
└────────┴───────┴───────┴───────┴────────┴─────────────┘
```

Notes:

| | |
|---|---|
| op | 6-bit operation code |
| rs | 5-bit source specifier |
| rt | 5-bit target (source/destination register) |
| immediate | 16-bit immediate, branch displacement, or address displacement |
| target | 26-bit jump target address |
| rd | 5-bit destination register specifier |
| shamt | 5-bit shift amount |
| funct | 6-bit function field |

FIG. 34

| Access Type | Low-Order Address Bits: A1 A0 | Bytes Accessed Big-Endian 31—0 | Bytes Accessed Little-Endian 31—0 |
|---|---|---|---|
| Word | 0 0 | 0 1 2 3 | 3 2 1 0 |
| Tribyte | 0 0 | 0 1 2 | 2 1 0 |
| | 0 1 | 1 2 3 | 3 2 1 |
| Halfword | 0 0 | 0 1 | 1 0 |
| | 1 0 | 2 3 | 3 2 |
| Byte | 0 0 | 0 | 0 |
| | 0 1 | 1 | 1 |
| | 1 0 | 2 | 2 |
| | 1 1 | 3 | 3 |

FIG. 35

DUAL PIPELINE SUPERSCALAR REDUCED INSTRUCTION SET COMPUTER SYSTEM ARCHITECTURE

This a continuation of U.S. patent application Ser. No. 08/540,336 filed Oct. 6, 1995, now U.S. Pat. No. 5,603,047, which is incorporated by reference.

BACKGROUND OF THE INVENTION

This invention relates generally to RISC (Reduced Instruction Set Computer) systems, and more particularly the invention relates to a RISC which is compatible with the MIPS-II instruction set and useful as a core with other circuit elements.

The conventional RISC such as the MIPS R3000 and R4000 are pipelined processors operating with a limited or reduced instruction set. The instruction pipeline includes instruction fetch (IF), read (RD), ALU or execute (EX), memory (MEM), and write back (WB). The processor includes a CPU and a system control co-processor for memory management and cache control. The CPU includes a general register file, an ALU, a shifter, a multiplier/divider, an address Addr, and a program counter. The MIPS R3000 and R4000 have compatible instruction sets except for the handling of exceptions.

The RISC offers distinct advantages in reduced hardware complexity and thus reduced design time and required area in a VLSI chip implementation, a uniform and streamlined handling of instructions, and increase in computing speed. A disadvantage resulting from the limited instruction set is the need for a plurality of instructions in executing some functions. Further, many RISC systems have large CPU register files to support RISC program execution and instruction traffic.

The present invention is directed to an enhanced CPU core which is compatible with both the R3000 and R4000 instruction sets.

SUMMARY OF THE INVENTION

In accordance with the invention, a microprocessor CPU has an architecture which includes a combination of five independent execution units: ALU, load/store/add unit (LSU), which executes loads and stores as well as add and load immediate instructions, a branch unit, a multiply/shift unit, and a co-processor interface for interfacing with a plurality of co-processor units. A co-processor zero unit (CP0) is the system control processor that supports address translation, exception handling, and other privileged operations. Other customer-defined co-processor units can be added.

All instructions except multiply and divide can be completed in one cycle. Two concurrent pipelines are provided for receiving two instructions per cycle. Each pipeline includes a queue (Q) stage between an instruction fetch (IF) and an instruction decode (RD) to boost branch instructions. When a branch instruction type is encountered and the queue stage is active, the branch is predicted to be taken, and IF starts at the branch address. At this point the queue stage holds the next non-branch instruction to execute. The branch target enters the RD stage, bypassing the queue stage. When the branch instruction enters the execute stage, the branch condition is resolved. If the branch was correctly predicted, then the instructions in the queue stage are cancelled. If the branch was incorrectly predicted, the branch target is cancelled. In this case, the non-branch sequential instructions are taken from the queue stage, and the IF is restarted at the non-branch sequential stream. Thus, when the branch instruction is correctly predicted, no duty cycle penalty is encountered. If the branch is incorrectly predicted, the branch has a one cycle penalty.

Exception processing is handled by the system control coprocessor (CP0) which has a plurality of registers that are used in exception processing. When an exception occurs, CP0 loads an exception program counter (EPC) with a restart location where execution may resume after the exception has been serviced. The restart location is the address of the instruction that caused the exception or, if the instruction was executing in a branch delay slot, the address of the branch instruction immediately preceding the delay slot. The instruction causing the exception along with all those following in the pipeline are aborted. The CP0 exception registers are examined during exception processing to determine the cause of an exception and the state of the CPU at the time of the exception. A Status register is a modification of the register of the R4000 architecture for upward compatibility of software written for processors based on the R3000 architecture.

The instruction set includes the standard MIPS-I and MIPS-II instruction sets along with added instructions. One such instruction is the Add with Circular Mask immediate instruction (ADDCIU). The immediate field of the instruction is sign extended and added to the contents of a general register, RS, the result of which is masked with the expanded value in a special register CMASK. This feature is particularly important in DSP and other applications that use circular buffers.

The invention and objects and features thereof will be more readily apparent from the following detailed description and dependent claims when taken with the drawings.

BRIEF DESCRIPTION OF THE DRAWINGS

FIGS. 8, 9, 10, 11, 12, 13, 14, 15, 16, 17, 18, 19, 20, 21, 22, 23, 24, 25, 26, 27, 28, 29, 30, 31, and 32 illustrate specific coprocessor register content.

FIG. 34 illustrates instructions formats.

FIG. 35 illustrates byte specifications for loads/stores.

DETAILED DESCRIPTION OF PREFERRED EMBODIMENT

Figure 1:
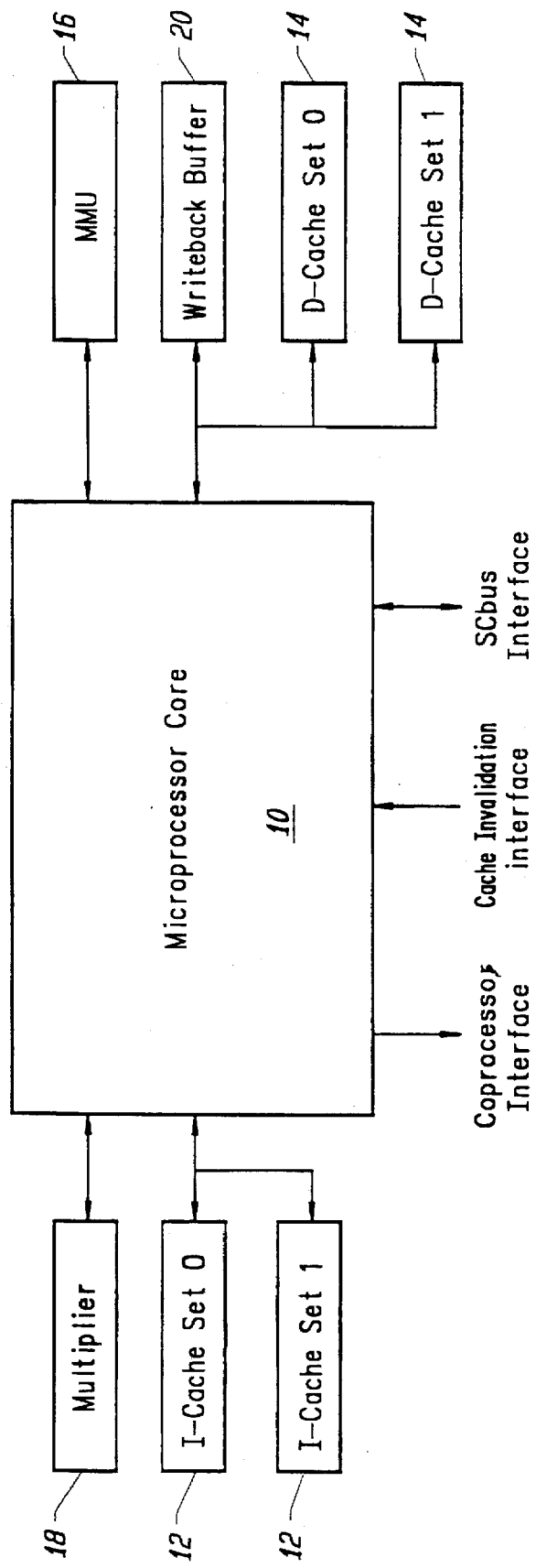
FIG. 1 is an illustration of the microprocessor core with building blocks.

FIG. 1 shows the superscalar microprocessor core in accordance with the invention along with building blocks which interface with the core. The microprocessor has been implemented using the LSI logic Core Ware system on a chip methodology whereby the core can be integrated into a system on a chip of various configurations. In the illustrated embodiment CPU core 10 is interconnected with a direct mapped or two-way set associative instruction cache 12, direct mapped or two-way associative data cache 14, a memory management unit 16 with 64 entry translation lookaside buffer, a standard multiply unit 18 or a high performance multiply/accumulate unit, and a Write Back buffer 20 for Write Back cache mode. The cache sizes are selectable up to 16 k bytes. The options allow a user to develop a self-defined microprocessor. The core has an interface 21 to a coprocessor, and interface 22 to a cache invalidation unit, and an interface 23 to SC bus.

As will be described, the microprocessor core comprises an updated architecture to provide higher absolute performance than any other available MIPS solution and is fully compatible with the R3000 and R4000 32-bit instruction sets (MIPS-I and MIPS-II).

Figure 2:
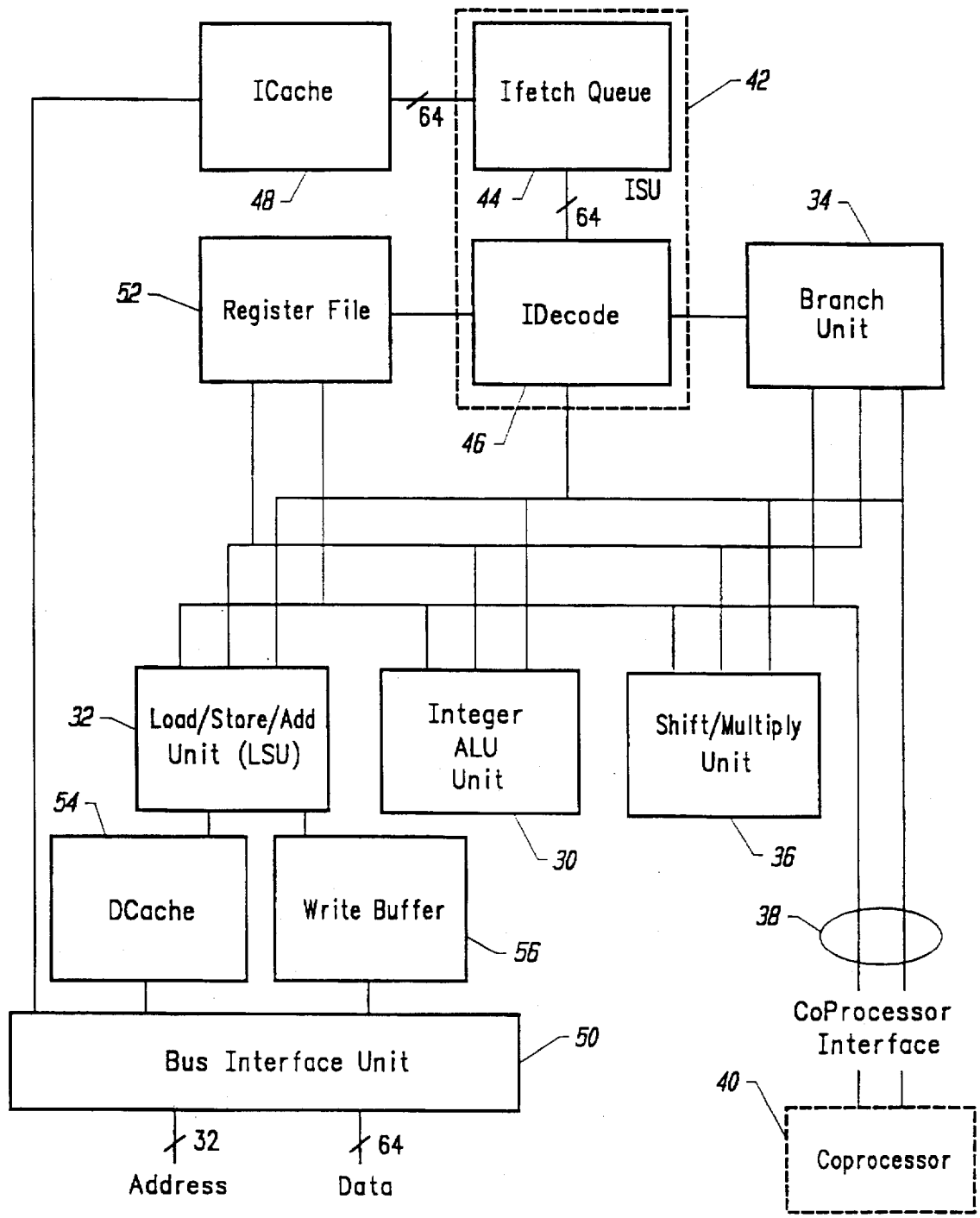
FIG. 2 is a functional block diagram of the CPU core.

FIG. 2 is a functional block diagram of the microprocessor core. The machine can issue and retire two instructions per cycle using a combination of five independent execution units: ALU 30, load/store/add unit (LSU) 32 which executes, loads and stores and can also execute, add and load immediate instructions, branch unit 34, multiply/shift unit 36 and coprocessor interface 38 with a coprocessor 40. The instruction scheduling unit (ISU) 42 includes Ifetch queue (Q) unit 44 and Idecode unit 46. An instruction cache 48 is connected between a bus interface unit 50 and queue stage 44. The bus interface unit 50 manages the flow of instructions and data between the core and the system via the SC bus interface. A register file 52 contains the general purpose registers of the core. It supplies source operands to the execution units and handles the storage of results to target registers. A data cache 54 and write buffer 56 are connected between bus interface unit 50 and LSU unit 32.

Ifetch queue 44 optimizes the supply of instructions to the microprocessor even across breaks in the sequential flow of execution (i.e., jumps and branches). Idecode unit 46 decodes instructions from the Ifetch queue, determines the actions required for the instruction execution, and manages the register file 52, LSU 32, ALU 30, and multiply unit 36 accordingly. Branch unit 34 is used when branch and jump instructions are recognized within the instruction stream.

LSU unit 32 manages loads in stores of data values. Loads come from either the Dcache 54 or the SC bus interface 50 in the event of a Dcache miss. Stores pass to the Dcache and SC bus interface through the write buffer 56. LSU unit 32 also performs a restricted set or arithmetic operations, including the addition of an immediate offset as required in address calculations. The integer ALU unit 30 calculates the result of an arithmetic or a logic operation, while the multiplier/shift unit 36 performs multiply and divide operations. Thus all three units perform logical, arithmetic, and data movement operations.

As will be described further below, coprocessor interface 38 allows the attachment of tightly coupled, special purpose processing units to enhance the microprocessors general purpose computational power. Using this approach, high performance application specific hardware can be made directly accessible to a programmer at the instruction set level. For example, a coprocessor might offer accelerated bitmapped graphics operations or realtime video decompression. A cache invalidation interface (FIG. 1) allows supporting hardware outside of the microprocessor core to maintain the coherency of onboard cache contents for systems that include multiple main bus masters.

Figure 3:
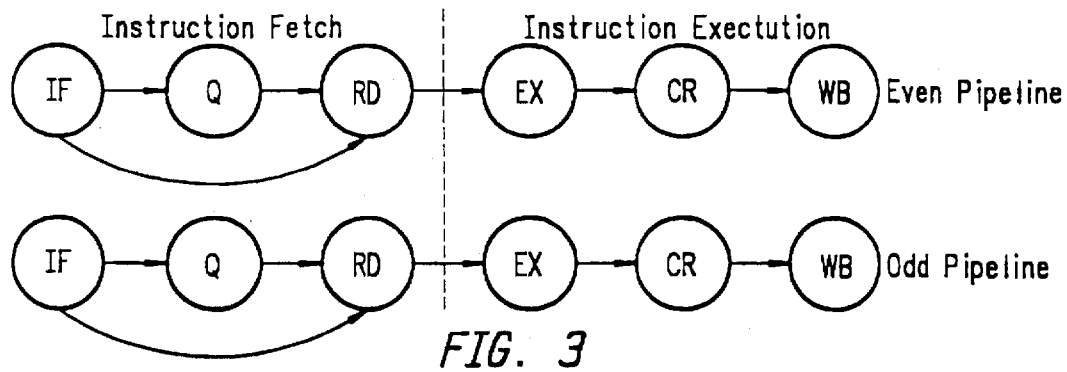
FIG. 3 illustrates the dual pipeline of the CPU.

FIG. 3 illustrates the dual pipeline architecture of the core. The two concurrent pipelines (even and odd) each have six stages. The first three stages comprise the instruction fetch phase and the last three stages comprise the instruction execution phase. In general, the execution of a single instruction consists of the following stages:

1. IF (instruction fetch) fetches the instruction.
2. Q (queuing) provides a conditional stage in which instructions may enter if they deal with branches or register conflicts. An instruction that does not cause a branch or register conflict is fed directly to the RD stage.
3. RD (read) reads any required operands from the register file while the instruction is decoded.
4. EX (execute) executes all instructions. Conditional branches are resolved in this cycle. The address calculation for load and store instructions are performed in this stage.
5. CR (cache read) is used to read the cache for load and store instructions. Data returned to the register bypass logic at the end of this stage.
6. WB (write back) is a register file in which results are written.

Each stage, once it has accepted an instruction from the previous stage, can hold the instruction for re-execution in case of pipeline stalls.

This circuitry is able to fetch and issue two instructions per cycle to the execute stage. Instructions are fetched as double word aligned pairs: slot-0 and slot-1. In the instruction decode stage, there is a two-instruction window. When only slot-0 can be scheduled because slot-1 has a dependency, then the window slides down one instruction. Thus although instructions are always fetched as double word pairs, they are scheduled on single word boundaries. Primary emphasis is placed on execution of branch instructions with minimal penalty. This is the primary function of the queue stage. In general; the queue stage is filled whenever the RD stage has a stall. This can occur fairly often for register conflicts, cache misses, resource conflicts, and the like. Filling the queue stage in this case allows the IF stage to work ahead one cycle.

When a branch instruction is encountered and the queue stage is active, the branch is predicted to be taken and IF starts at the branch address. At this point, the queue stage holds the next non-branch instructions to evaluate. The branch target enters the RD stage, bypassing the queue stage. When the branch instruction enters the execute stage, the branch condition is resolved. If the branch was correctly predicted, then the instructions in the queue stage are cancelled. If the branch was incorrectly predicted, then the branch target is cancelled. In this case, the non-branch sequential instructions are taken from the queue stage, and the IF stage restarts at the non-branch sequential stream. In general, this means that a branch instruction which is correctly predicted from the even 1 slot and the queue stage is full, will have no cycle penalty associated with it. In the case where the branch is incorrectly predicted the branch has a one cycle penalty.

If the branch instruction is in the odd one slot, then the branch delay slot instruction will always execute by itself, with no chance to fill the other execution slot.

The branch prediction logic is capable of looking at two instructions at a time, from either the queue latches or the RD latches, depending on whether the queue stage is active. From the two instructions, if one is a branch, then the offset in that instruction is passed into a dedicated Addr to calculate the branch address for the IF stage instruction fetch. Since this is done speculatively, the non-branch value of the PC is also saved for the possible restart of the sequential instructions from the queue stage.

Once an instruction pair has been allowed to pass into the RD stage, it is decoded and at the same time the register source addresses are passed to the register file for reading operands. Register dependencies and resource dependencies are checked in this stage. If the instruction in slot-0 has no dependency on a register or resource currently tied up by previous instruction, then it will be passed immediately into the EX stage where it forks to the appropriate execution unit. The instruction in slot-1 may also be dependent on a resource or register in slot-0, so it must be checked for dependencies against both slot-0 and any previous not retired instruction. If either instruction must be held in the RD stage, then if the queue stage is not full, the IF stage will be allowed to continue in order to fill the queue stage. If the queue stage is full, then the queue and IF stages will be frozen or stalled. Register bypass opportunities are considered in the RD stage, and the bypass multiplexors control signals are set for potential bypass cases from a previous instruction which is still in the pipeline. For instruction execution, the pair of instructions or a single instruction when there was a previous block, are individually passed to the independent execution units. Each execution unit receives operands from the register bypass logic and an instruction from the instruction scheduler. Each instruction spins one run cycle in an execution unit. In the case of ALU and other single cycle instructions, the result is then fed to the register/bypass unit for the CR stage.

For load and store instructions, the cache look-up occurs during the CR stage. For loads, data is returned to the register/bypass unit during this stage. This includes loads to a coprocessor. For all other instructions these are holding stages which are used to hold the result of the execution stage for write back to the register file.

Figure 4:
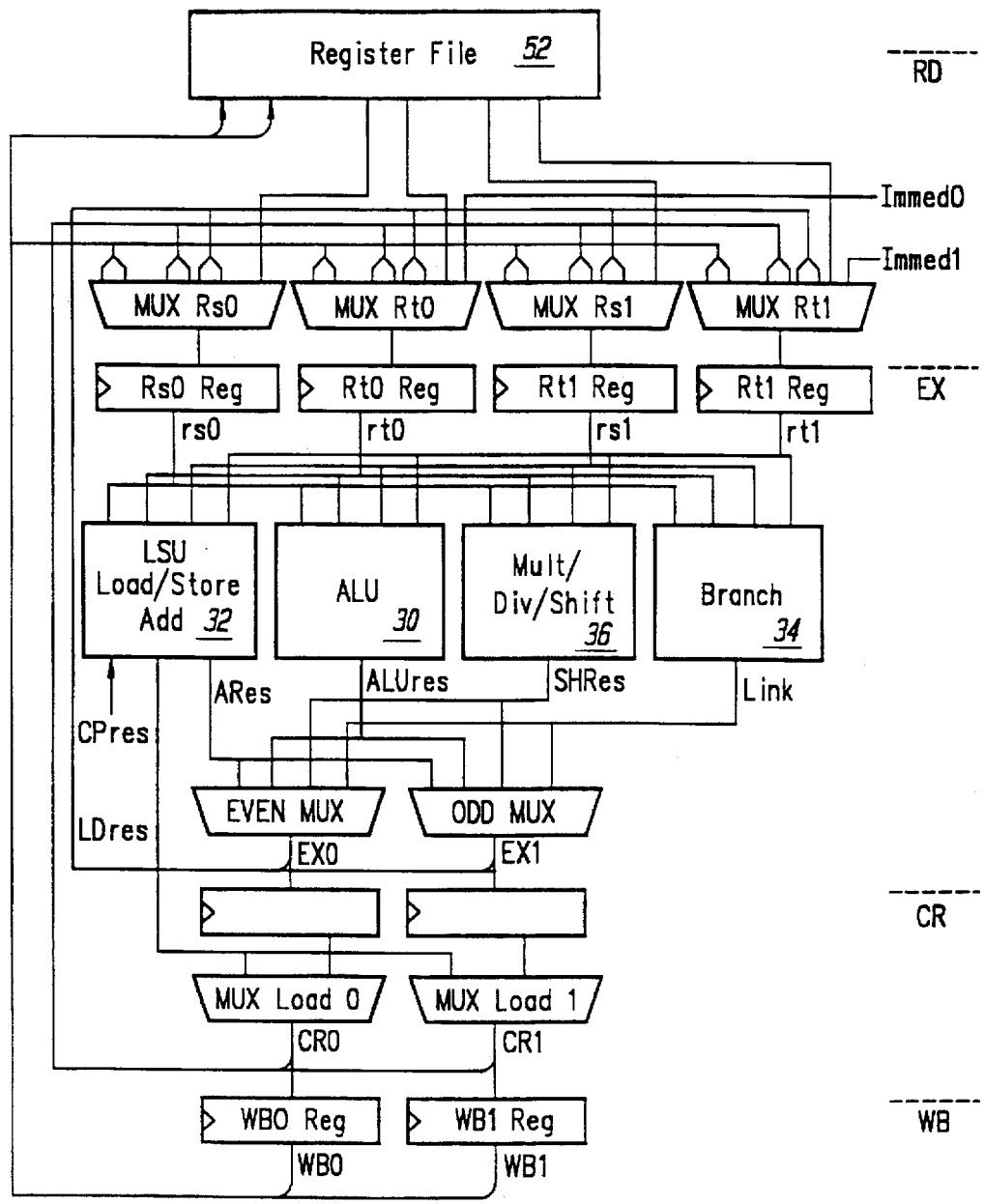
FIG. 4 is a schematic of the data path of the CPU.

FIG. 4 is a schematic of the CPU data path with various stages of the pipeline labeled to visualize the instruction execution flow. The data path is organized around different blocks. All instructions are issued at the RD stage under the control of an instruction scheduling unit. The architecture of the data path balances the ability of executing a dual instruction per cycle and the underlying complexity essentially due to the execution units.

Most of the instructions execute in a single cycle at the EX stage except for the divide, multiply, and derivative instructions. For theses instructions, once their opcodes are decoded at the RD stage, these successive operations are controlled internally to the ALU and the ISU is informed that the associated unit is busy.

When a memory instruction is decoded, the LSU unit 32 assumes responsibility for the successive steps and resolves eventual resource complex detected at the EX stage and following stages of the pipeline. LSU unit 32 informs the ISU that its pipeline cannot get advanced due to a resource conflict. ISU takes the appropriate action by stalling the ALU pipeline and does not issue any new instructions.

LSU also informs ISU that both a data from a load instruction is missing and has been retrieved after an external transaction has taken place. ISU then inserts the retrieved data back into the appropriate write back register and at the same time forwards the retrieved data to the operand source register. However, when an arithmetic or a branch instruction is decoded, the ISU unit controls the instruction flow at all stages. Thus when a memory instruction is referenced and no resource conflicts prevent this instruction to be issued, the LSU receives from the ISU an enable execution signal active.

When one or two instructions need to execute within the ALU, their flow is controlled by a set of clock enabled signals coming from ISU. The register file includes four read ports and two write ports. It is part of the RFU unit and incorporates 32 general purpose CPU registers.

After instructions have been issued, their subsequent results can be forwarded to the source operand registers at each stage of the pipeline. A set of bypass multiplexors controlled by ISU will select either the register file read ports and/or the results coming from the different stages of the pipeline.

Figure 5:
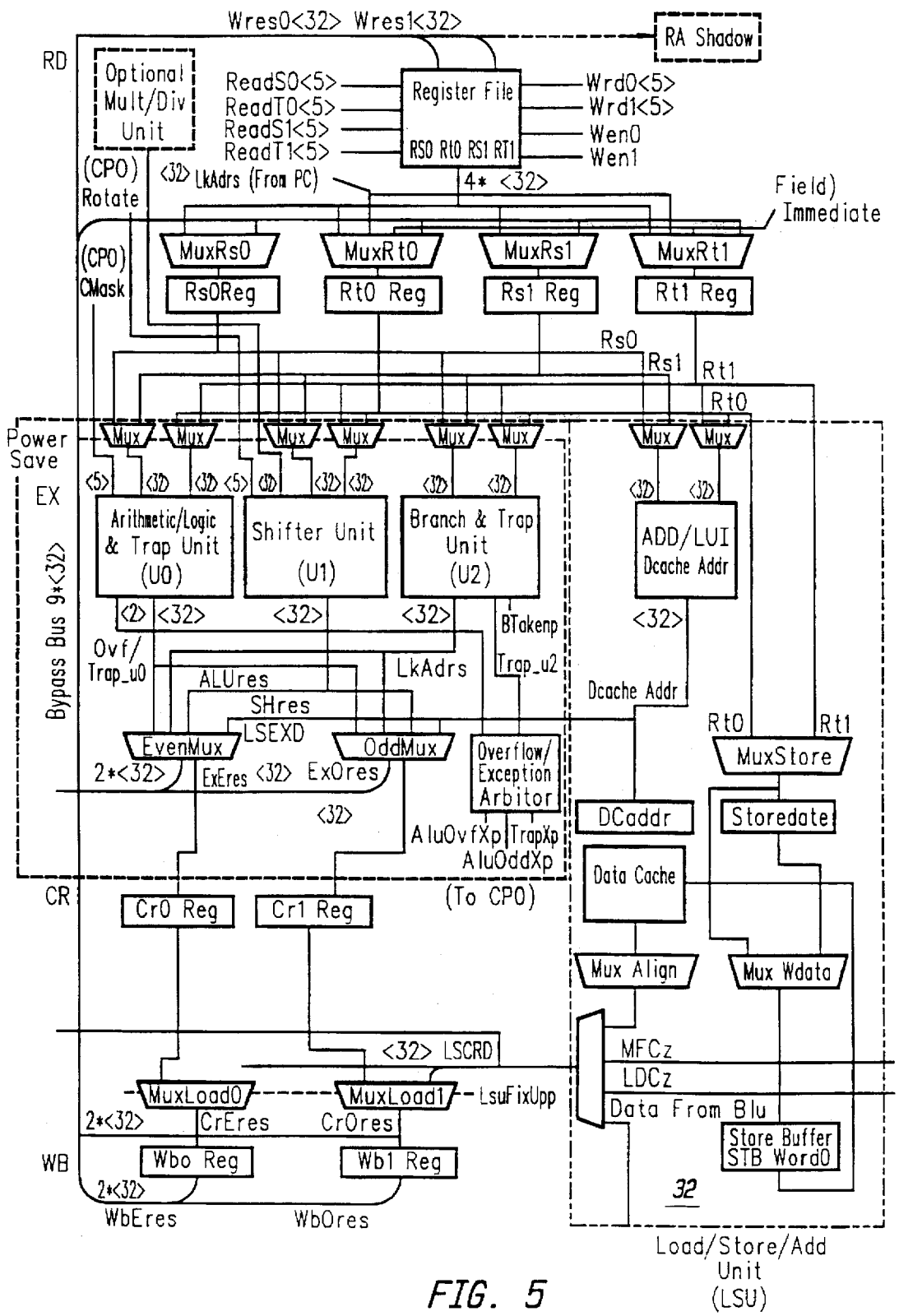
FIG. 5 illustrates the CP0 registers and translation lookaside buffer (TLB) of the CP0.

FIG. 5 is another illustration of the data path and further illustrating ALU 30 and LSU 32. ALU 30 is partitioned to allow independent execution of an ALU class instruction in parallel with a branch/trap instruction or other instructions (described hereinbelow). The multiply/divide type instructions are handled by an optional multiply/divide unit outside of the ALU but the results are forwarded to the ALU shifter unit (U1). The ALU, shift, and FFS/FFC instructions are all one cycle, combinatorial operations which are entirely controlled by the opcodes provided. The multiply, divide, MADD, and MSUB instructions are multi-cycle instructions. The control unit takes unit enable strobes and the pipeline stage control signals from the ISU and then passes them to associated units for decoding (NRD) and processing (NEX). It also handles the data path and pipe stage controls to direct EX stage results from four different execution units (U0/U1/U2/LSU Addr) to their proper destinations (even/odd/CR/WB stage or bypass). For ALU or link-type instructions, the outcomes of AL units (U0/U1/U2) and LSU Addr (if used) will be mixed at the end of EX stage and passed to their destination through CR/WB stage or bypass paths depending on their cases. Branch/trap instructions (no link to registers involved) will end at EX stage and the resulting signals (B taken/trap XP/ALUOVFXP/ALU odd XP) will go to ISU/CPO as soon as they are valid for their associated logic at the EX stage and do not involve the CR/WB stages. For memory-type instructions the result from LSU will pass to ALU at CR stage for advancing through the pipeline.

Figure 6:
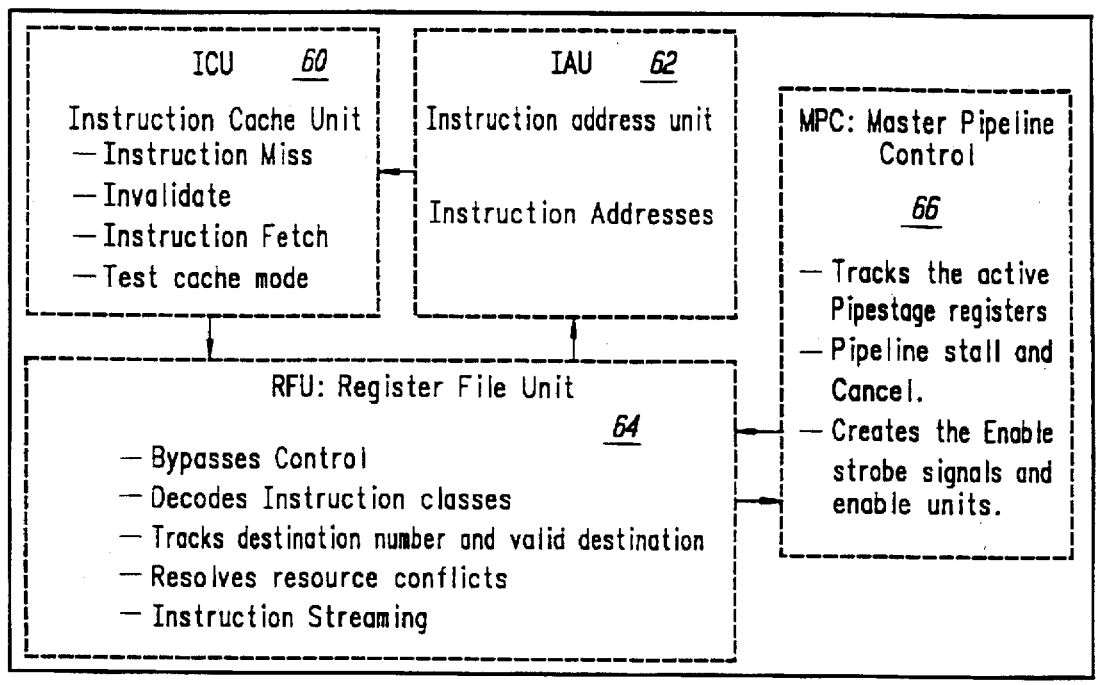
FIG. 6 illustrates functions of the Instruction Scheduling Unit.

FIG. 6 defines the main tasks of the ISU. The ISU receives instruction pairs at the early instruction fetch stage, decodes the instructions at the RD stage, and eventually reorders the instructions and issues them at the EX stage. It decodes and forwards external coprocessor and CPO instructions and centralizes the events that impact the pipeline.

The instruction cache unit (ICU) 60 is active for each instruction fetch cycle and informs the master pipeline control and register file units if an instruction is missing. It is the control part of the instruction cache.

The instruction address unit 62 provides the instruction cache addresses. Address sources are multiple and include sequential addresses, delay slot sequential addresses, a target address of a jump instruction, contents of the register from the register file, address bus from CPO for an exception routine and return from exception, and an address coming from the queue address register in order to recover from an incorrect prediction.

The register file unit 64 handles both the queue and RD stages. It also determines whether or not instructions can be issued. The register file resolves in realtime the resource conflicts due either to a data dependency or to a structural conflict. Conjointly with the MPC it broadcasts both to the ALU, LSU and external coprocessors the appropriate control signals in order to regulate the ALU pipeline, CPO and external coprocessors. When a memory instruction is decoded, it informs LSU unit that a load or a store instruction is to be issued.

The master pipeline control unit (MPC) 66 monitors the control signals coming from the RFU and provides the strobe signals to the IF, queue, and RD stage registers according to the resource conflicts coming from RFU and according to the state of the queue register (inactive or active). Externally, the MPU receives a general stall information from the LSU unit and takes the appropriate action by stalling all of the pipelines and informs the coprocessors to stop. From CP0 it also receives a valid exception signal and cancels the pipeline from the IF up to the TC stages. It broadcasts this cancel signal to both LSU and coprocessors to take the appropriate action. In normal mode operation, the MPU provides all the signals enabling the pipeline register clocks for the ALU pipeline. When both a coprocessor instruction is decoded by RFU and the corresponding coprocessor is not busy and is usable, the MPU provides the strobe signal to the related coprocessor. It also provides LSU with its enable signals whenever a memory instruction is decoded at RD stage.

Exceptions are handled by the coprocessor 0 (CP0). When the CPU detects an exception, the normal sequence of instruction execution is suspended; the processor exits user mode and enters a supervisory mode. The processor then disables, interrupts and forces execution of a software handler located at a fixed address and memory. The handler saves the context of the processor, this context must be restored when the exception has been handled.

Figure 7:
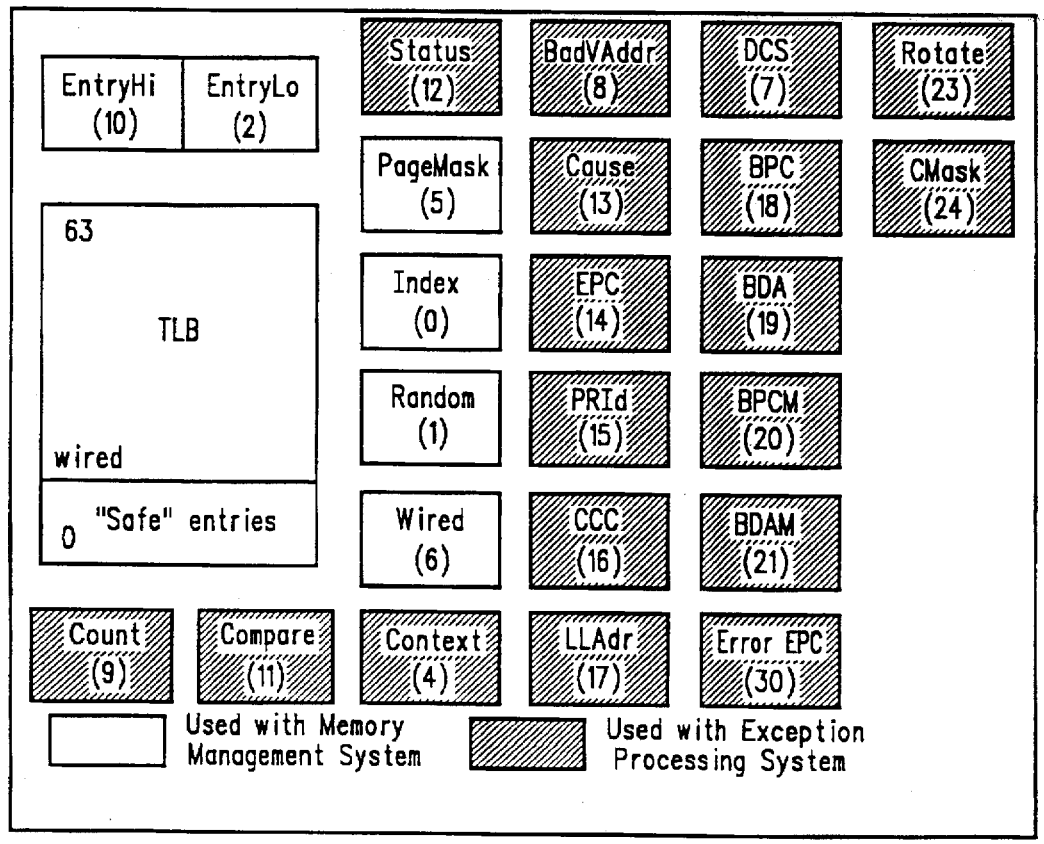
FIG. 7 illustrates coprocessor registers and Translation Lookaside Buffer.
Figure 8:
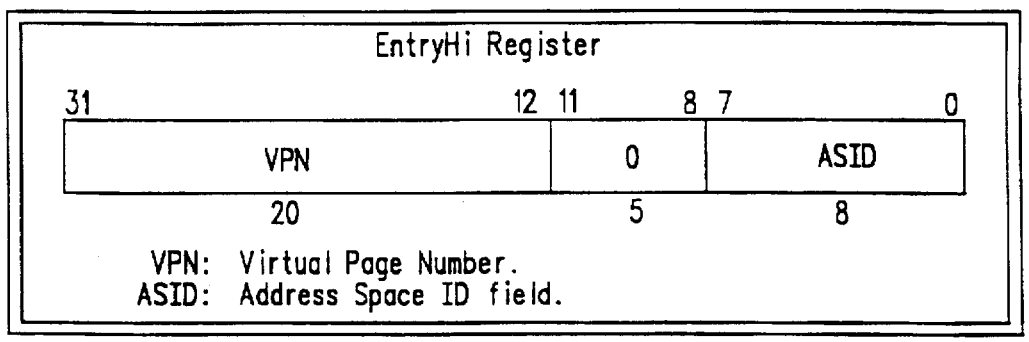
Figure 9:
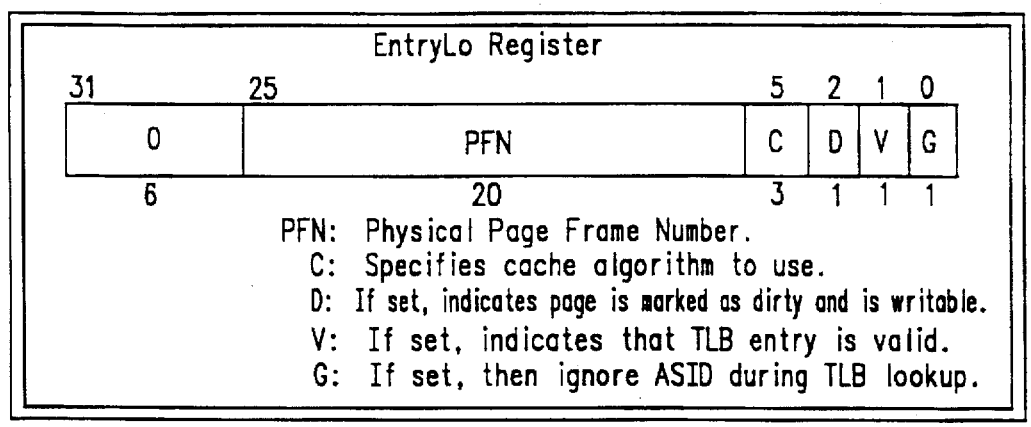
Figure 10:
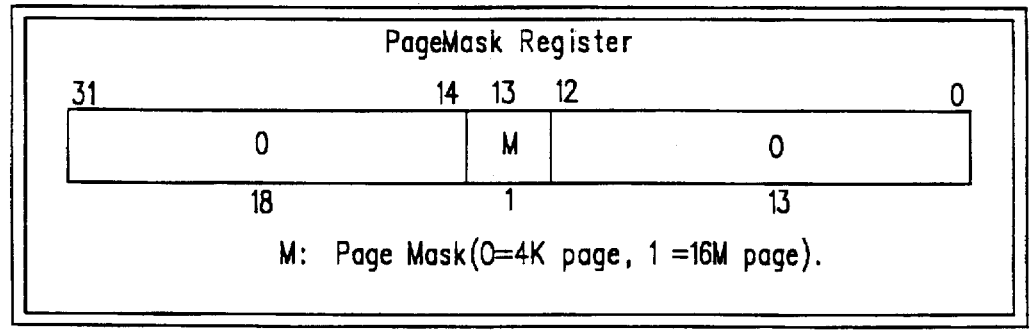
Figure 11:
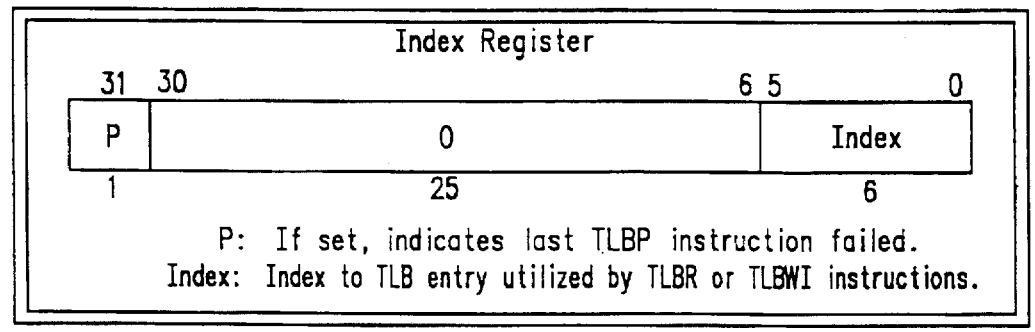
Figure 12:
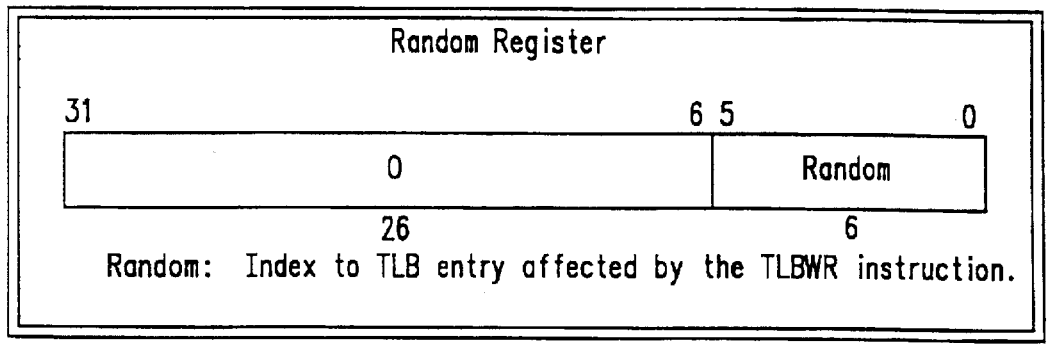
Figure 13:
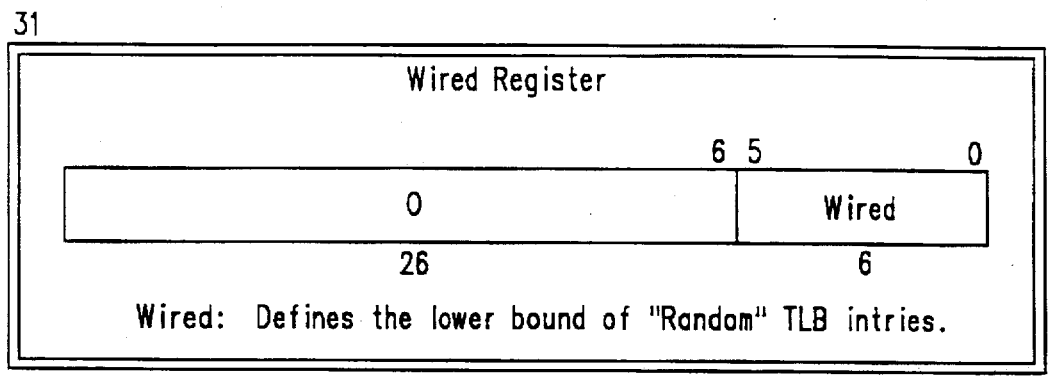

CP0 is called the system control coprocessor and is implemented as an integral part of the processor system. Besides exception handling, CP0 supports address translation and other privileged operations. It contains a 64 entry Translation Lookaside Buffer (TLB) plus 24 registers as shown in FIG. 7.

The following six registers are used with the memory management system and support the translation lookaside buffer;

EntryHi register—this register is a read/write register used to access the TLB. In addition, the register contains the current ASID value for the processor. This is used to match the virtual address with a TLB entry during virtual address translation. The register holds the high order bits of a TLB entry when performing TLB read and write operations. When either a TLB refill, TLB invalid, or TLB modified exception occurs, this register is loaded with the virtual page number (VPN) and the ASID of the virtual address that failed to have a matching TLB entry.

EntryLo (2) register—this register is a read/write register used to access the TLB. When performing read and write operations, it contains the physical page, frame number, cache algorithm, page dirty, translation valid and global entry information.

Pagemask register—this register is a read/write register used to access the TLB. It implements a variable page size by holding a per entry comparison mask. When virtual addresses are presented for translation, the corresponding pagemask bit in the TLB specifies whether or not virtual address bits participate in the comparison.

Index register—this register is a 32-bit read/write register containing six bits that are used to index an entry in the TLB. The Hi order bit indicates the success or failure of a TLB probe (TLBP) instruction. The index register also specifies the TLB entry that is affected by the TLB read (TLBR) and TLB write index (TLBWI) instructions.

Random register—this register is a read-only register of which six bits are used to index an entry in the TLB. The register decrements for each instruction executed. The values range between a lowerbound set by the number of TLB entries reserved for exclusive use by the operating system (defined in the wired register), and an upperbound set by the total number of TLB entries (64 maximum). The random register specifies the entry in the TLB affected by the TLB write random (TL-BWR) instruction. The register does not need to be read for this purpose; however, the register is readable to verify proper operation.

All other registers of CP0 are used with the exception processing system. When an exception occurs, CP0 loads the Exception Program Counter (EPC) with a restart location where execution may resume after the exception has been serviced. The restart location in the EPC is the address of the instruction that caused the exception or, if the instruction was executing in a branch delay slot, the address of the branch instruction immediately preceding the delay slot. The instruction causing the exception along with all those following the pipeline are aborted.

Figure 14:
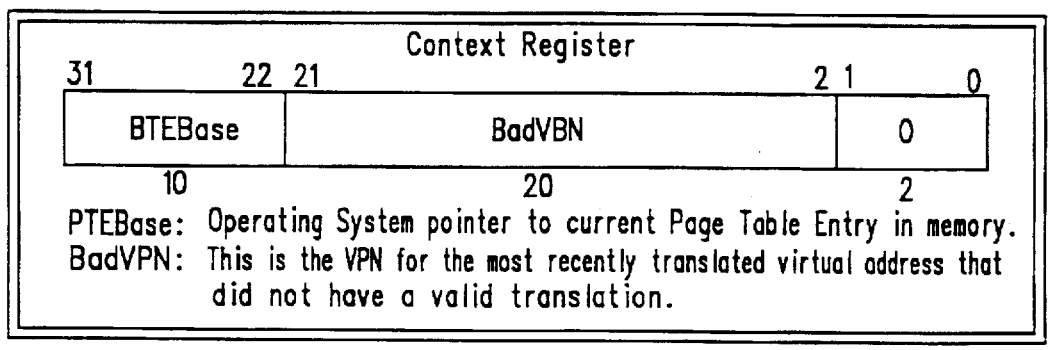

Software examines the registers of the CP0 used with exception processing system to determine the cause of an exception and the state of the CPU at the time of the exception. Each of these registers is described as follows:

The Context register is a read/write register containing a pointer to an entry in the Page Table Entry (PTE) array. This array is an operating system data structure which stores virtual to physical address translations. When there is a TLB miss, operating system software handles the miss by loading the TLB with the missing translation from the PTE array. The BadVPN field is not writable. It contains the VPN of the most recently translated virtual address that did not have a valid translation (TLBL or TLBS). The PTEBase field is both writable as well as readable, and indicates the base address of the PTE table of the current user address space. The Contract register duplicates some of the information provided in the BadVAddr register, but the information is in a form that is more useful for a software TLB exception handler. The Context register can be used by the operating system to hold a pointer into the PTE array. The operating systems sets the PTE base field register, as needed. Normally, the operating system uses the Context register to address the current page map, which resides in the kernel-mapped segment kseg3. The register is included solely for use of the operating system. FIG. 14 shows the format of the Context register. The 20-bit BadVPN field contains bits 31:12 of the virtual address that caused the TLB miss. This format can be used directly as an address in a table of 4-byte PTEs for a page size of 4K bytes. For other PTE and page sizes, shifting and masking this value produces an appropriate address.

Figure 15:
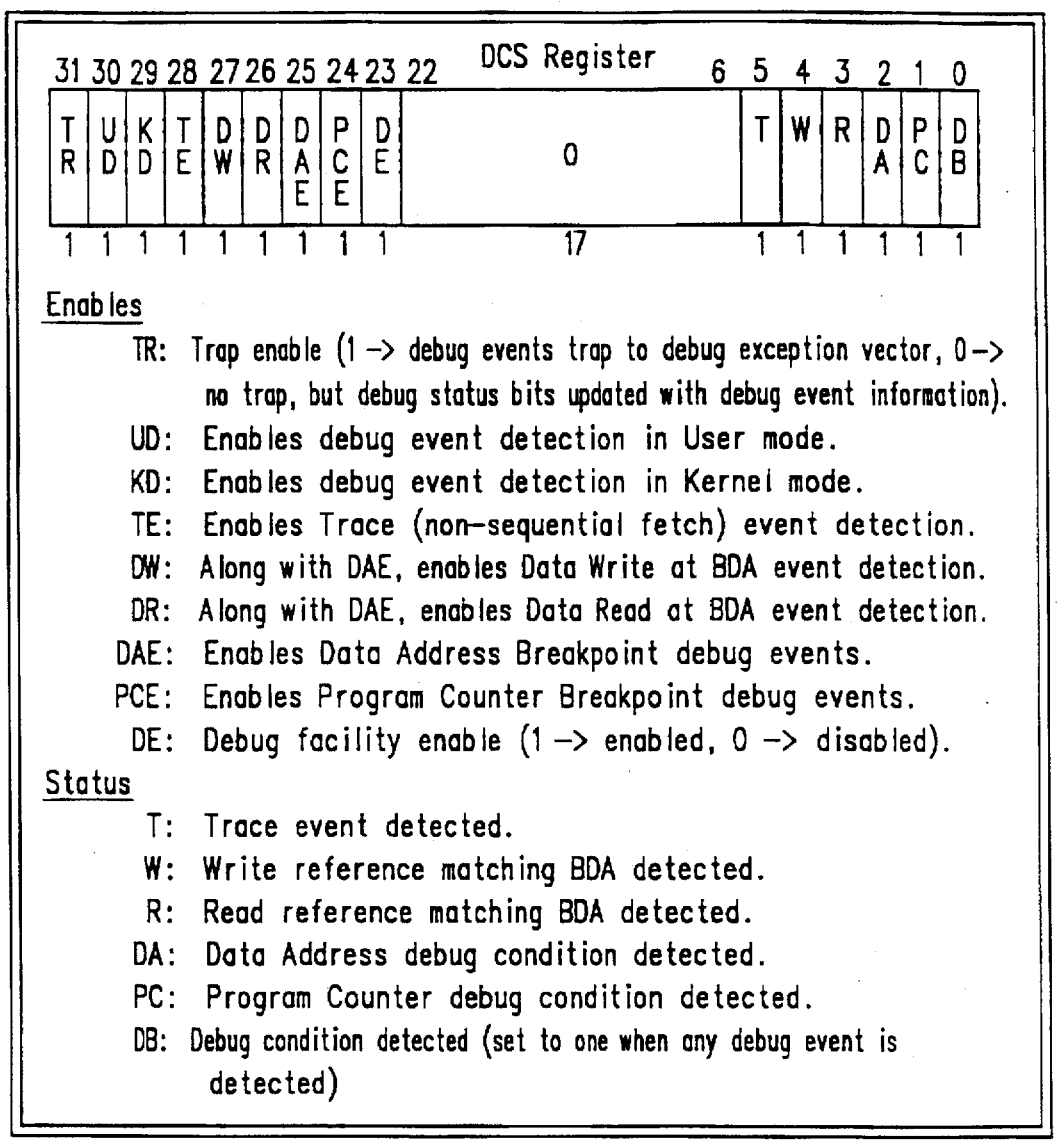

The Debug Control and Status (DCS) register contains the enable and status bits for the SCobra debug facility. All bits have read/write access. FIG. 15 shows the format of the DCS register.

Figure 16:
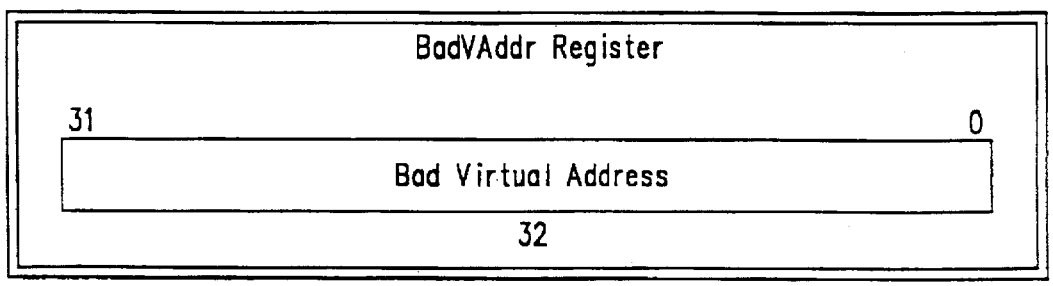

The Bad Virtual Address register (BadV Addr) is a read-only register that holds the failing virtual address for address error (AdEL, AdES) and TLB translation (TLBL, TLBS, Mod) exceptions. FIG. 16 shows the format of the Context register.

Figure 17:
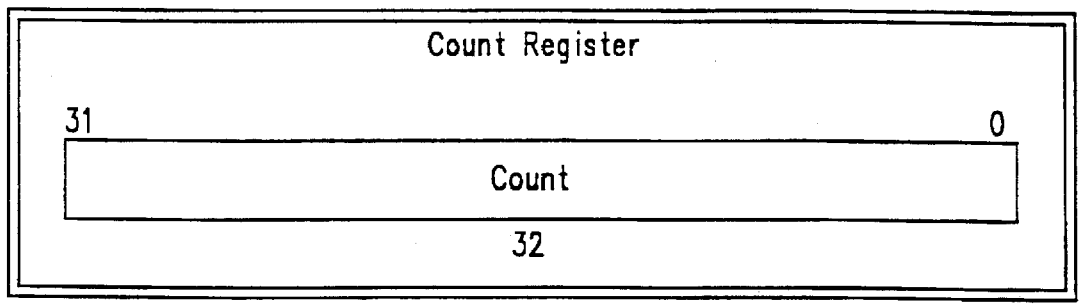

The Count register acts as a timer, incrementing at a constant rate whether or not an instruction is executed, retried, or any forward progress is made. This register increments at half the maximum instruction issue rate. This is a read/write register; it can be written for diagnostic purposes or system initialization to synchronize two processors operating in lock step. FIG. 17 shows the format of the Count register.

Figure 18:
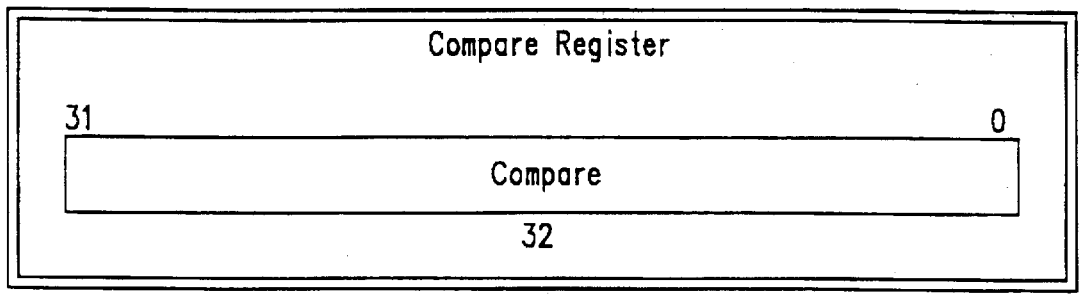

The Compare register implements a timer service (see also the Count register) which maintains a stable value and does not change on its own. When the time facility is enabled and the value of the Count register equals the value of the Compare register, interrupt bit IP7 in the Cause register is set. This causes an interrupt to be taken on the next execution cycle in which the interrupt is enabled. Writing a value to the Compare register, as a side effect, clears the timer interrupt. For diagnostic purposes, the Compare register is read/write. In normal operation, the Compare register is only written. FIG. 18 shows the format of the Compare register.

The Status register is a read/write register that contains the operating mode, interrupt enabling, and the diagnostic states of the processor.

Figure 19:
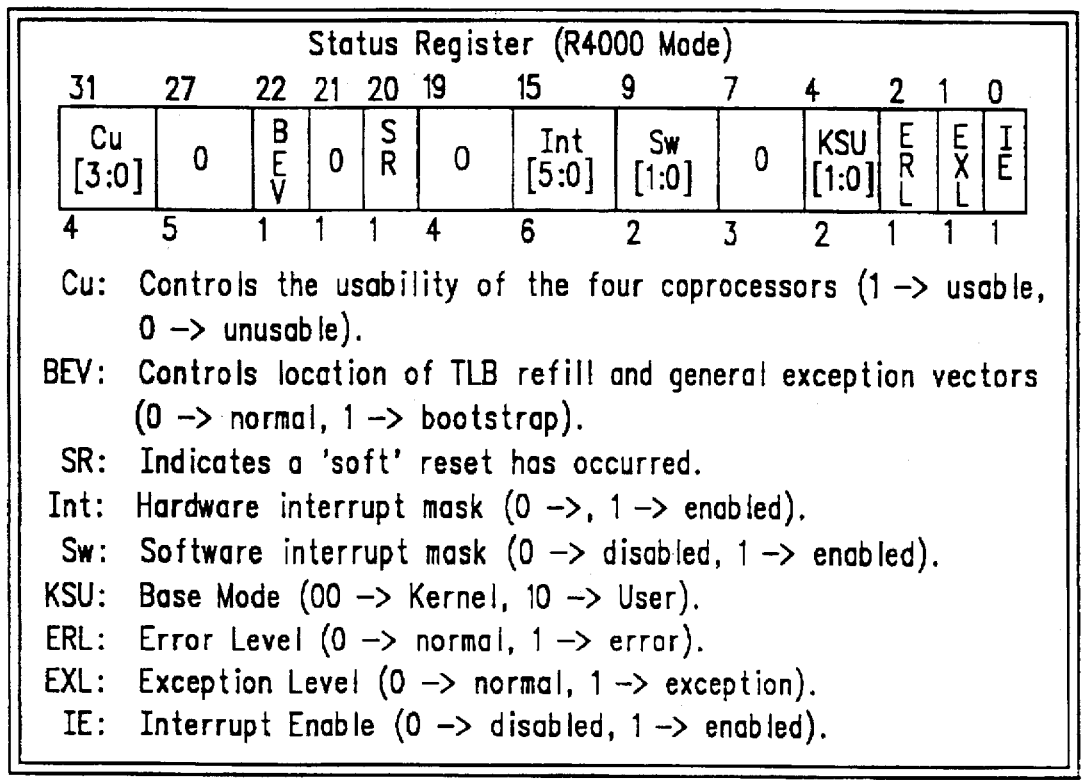

The format of the R4000 version of this register (CCC [24]=0) is shown in FIG. 19.

Interrupt Enable: Interrupts are enabled when all the following field conditions are true:

IE is set to 1.
EXL is cleared to 0.
ERL is cleared to 0.

If these conditions are met, interrupts are recognized according to the setting of the Int and Sw mask bits.

Processor Modes: SCobra processor mode definitions are as follows:

The processor is in User mode when KSU is equal to 10, and EXL and ERL are set to 0.

The processor is in Kernel mode when KSU is equal to 00, or EXL or ERL is set to 1.

Kernel Address Space Accesses: Access to the Kernel address space is allowed only when the processor is in Kernel mode.

KSU is equal to 00, or EXL is set to 1, ERL is set to 1.

User Address Space Accesses: Access to the User address space is always allowed.

Cold Reset: The contents of the Status register are undefined after a cold reset, except the following bits:

ERL and BEV are set to 1.

Warm Reset: The contents of the Status register are unchanged by warm reset, except the following bits:

ERL, BEV and SR bits are set to 1.

The format of R3000 version of this register (CCC[24]=1) is shown in FIG. 20.

Interrupt Enable: interrupts are enabled when the following field condition is true:

IEc is set to 1.

If this condition is met, interrupts are recognized according to the setting of the Int and Sw mask bits. The IEo/IEp/IEc bits comprise a 3-level stack showing the old/previous/current interrupt enable settings.

Processor Modes: SCobra processor mode definitions are as follows:

The processor is in User mode when KUc is equal to 1.
The processor is in Kernel mode when KUc is equal to 0.

The KUo/KUp/KUc bits comprise a 3-level stack showing the old/previous/current processor state settings.

Kernel Address Space Accesses: Access to the Kernel address space is allowed only when the processor is in Kernel mode.

User Address Space Accesses: Access to the User address space is always allowed.

Warm Reset: The contents of the Status register are unchanged by warm reset, except the following bits:

BEV and SR bits are set to 1.

Kuo/IEo≦Kup/IEp≦KUc/IEc≦0/0.

When an exception is recognized, both the KU and IE bits are "pushed" deeper into the stack with KUc and IEc set to zero (i.e., KUo/IEo≦KUp/IEp≦KUc/IEc≦0).

When a Return From Exception (RFE) instruction is executed, the values are "popped" off the stack with KUc/IEc being set to their previous values (i.e., KUc/IEc≦KUp/IEp≦KUo/IE0).

The Cause register is a read/write register. The Cause register's contents describe the cause of the most recent exception. A 5-bit exception code (ExcCode) indicates the cause as listed in the table below. The remaining fields contain detailed information specific to certain exceptions. All bits in the register with the exception of the IP<1:0> bits are read only. IP<1:0> bits are used for software interrupts. The format of the register is shown in FIG. 21.

| Exception Code Value | Mnemonic | Description |
| --- | --- | --- |
| 0 | Int | Interrupt |
| 1 | Mod | TLB modification exception |
| 2 | TLBL | TLB exception (load or instruction fetch) |
| 3 | TLBS | TLB exception (store) |
| 4 | AdEL | Address error exception (load or instruction fetch) |
| 5 | AdES | Address error exception (store) |
| 6 | Bus | Bus error exception |
| 7 | — | Reserved |
| 8 | Sys | Syscall exception |
| 9 | Bp | Breakpoint exception |
| 10 | RI | Reserved instruction exception |
| 11 | CpU | Coprocessor Unusable exception |
| 12 | Ov | Arithmetic overflow exception |
| 13 | Tr | Trap exception |
| 14 | — | Reserved |
| 15 | FPE | Floating-point exception |
| 16–31 | — | Reserved |

The Exception Program Counter (EPC) is a read-write register that contains the address where processing resumes after an exception has been serviced. For synchronous exceptions, the EPC register contains either:

the virtual address of the instruction that was the direct cause of the exception, or the virtual address of the immediately preceding branch or jump instruction (when the instruction is in a branch delay slot, and the Branch Delay bit in the Cause register is set).

Figure 22:
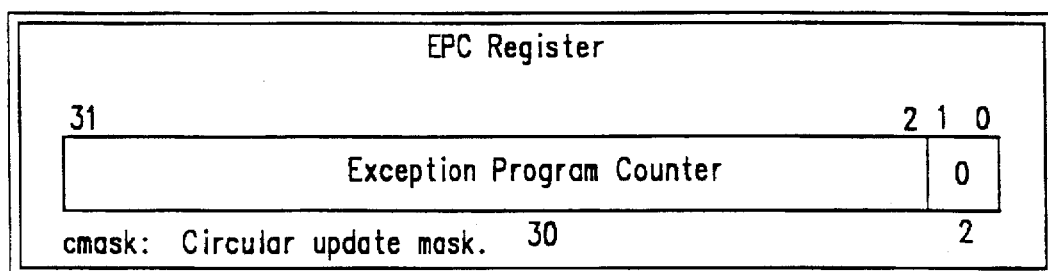

FIG. 22 shows the format of the EPC register.

Figure 23:
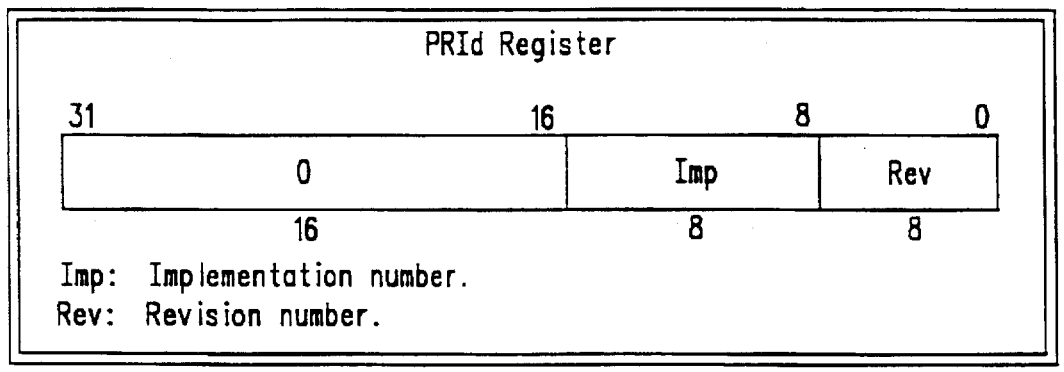

The Processor Revision Identifier (PRId) is a 32-bit, read-only register that contains information identifying the implementation and revision level of the CPU and CP0. FIG. 23 shows the format of the PRId register.

The low order byte (bits <7:0>) of the PRId register is interpreted as a coprocessor unit revision number, and the second byte (bits <15:8>) is interpreted as a coprocessor unit implementation number. The SCobra implementation number is X. The contents of the high-order halfword of the register are reserved.

The revision number is a value of the form y·x, where y is a major revision number in bits <7:4> and x is a minor revision number in bits <3:0>.

The revision number can distinguish some chip revisions. However, LSI does not guarantee that changes to this core will necessarily be reflected in the PRId register, or that changes to the revision number necessarily reflect real core changes. For this reason these values are not listed and software should not rely on the revision number in the PRId register to characterize the core.

The Configuration and Cache Control (CCC) register allows software to configure various pieces of the SCobra design (i.e., BIU, TLB, Cache Controllers). FIG. 24 shows the format of the CCC register.

The Load Linked Address (LLAddr) register is a read/write register that contains the physical address read by the most recent Load Linked instruction. This register is used only for diagnostic purposes, and serves no function during normal operation. FIG. 25 shows the format of the LLAddr register.

Note: This register is physically located in the LSU, CP0 must send read/write signals to the LSU when the value is to be read/written.

Figure 26:
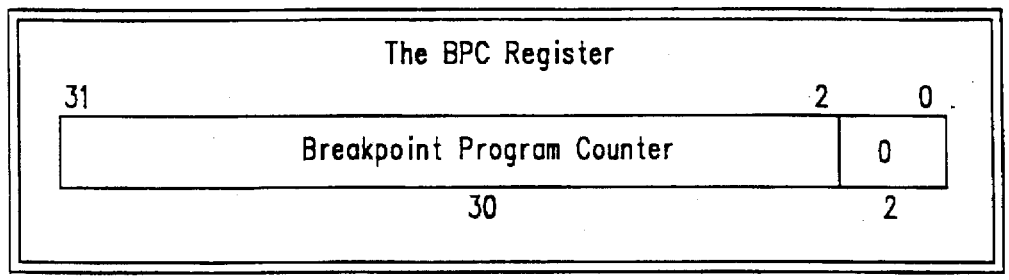

The Breakpoint Program Counter (BPC) register is a read/write register that software uses to specify a program counter breakpoint. FIG. 26 shows the format of the 32-bit BPC register.

This register is used in conjunction with the Breakpoint PC Mask register listed below.

Figure 27:
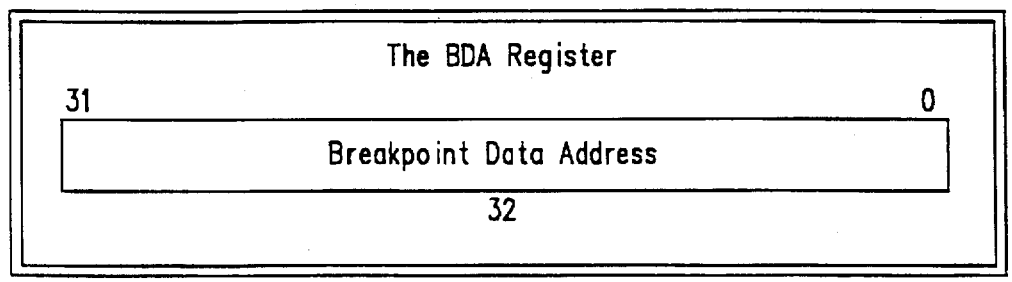

The Breakpoint Data Address (BDA) register is a read/write register that software uses to specify a virtual data address breakpoint. FIG. 27 shows the format of the 32-bit BDA register.

This register is used in conjunction with the Breakpoint Data Address Mask register listed below.

Figure 28:
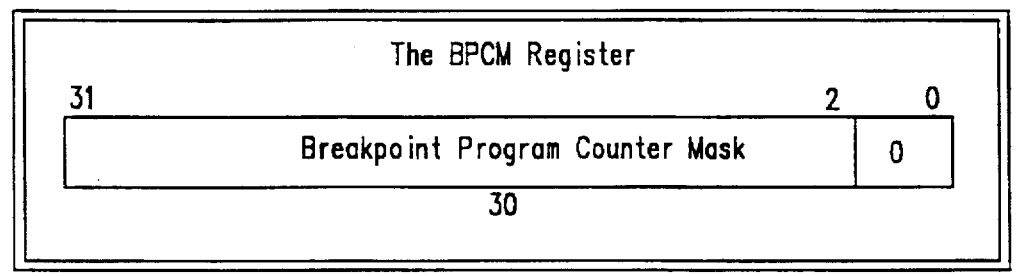

The Breakpoint Program Counter Mask (BPCM) register is a read/write register that masks bits in the BPC register. A one in any bit in the BPCM register indicates the SCobra compares the corresponding bit in the BPC register for program counter (debug) exceptions. Values of zero in the mask indicate that SCobra does not check the corresponding bits in the BPC register. FIG. 28 shows the format of the 32-bit BPCM register.

Figure 29:
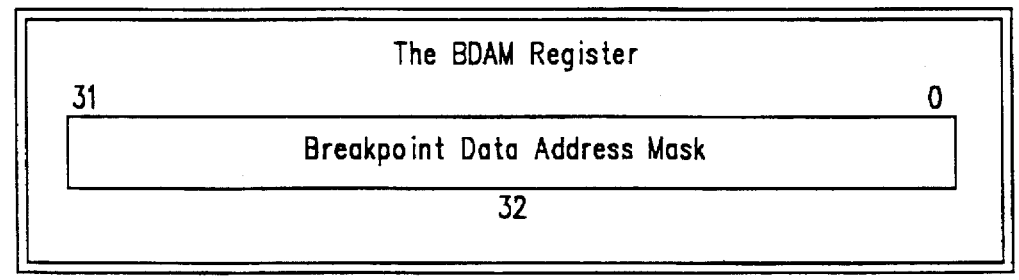

The Breakpoint Data Address Mask (BDAM) register is a read/write register that masks bits in the BDA register. A one in any bit in the BDAM register indicates that SCobra compares the corresponding bit in the BDA register for data address (debug) exceptions. Values of zero in the mask indicate that SCobra does not check the corresponding bits in the BDA register. FIG. 29 shows the format of the 32-bit BDAM register.

Figure 30:
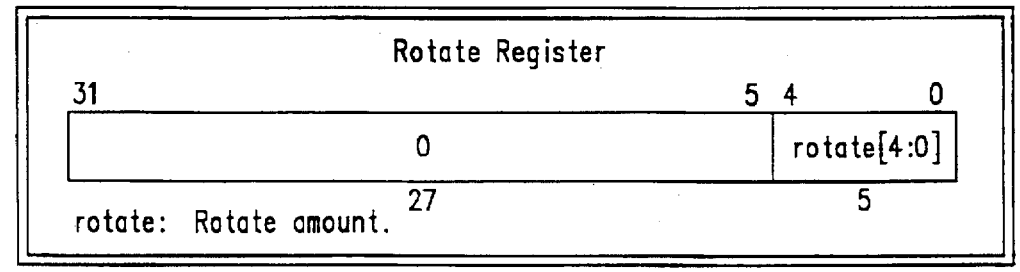

The Rotate Register is utilized by new SCobra instruction set extensions. Select and rotate right (SELSL) (sic) and select and rotate left (SELSR) (sic) use this 5-bit value as the shift count. This is useful for data alignment operations in graphics, and in bit-field selection routines for data transmission and compression applications. FIG. 30 shows the format of the Rotate register.

Mote: even though this register resides within CP0, user-mode access will always be granted regardless of the value contained in Status [Cu0].

Figure 31:
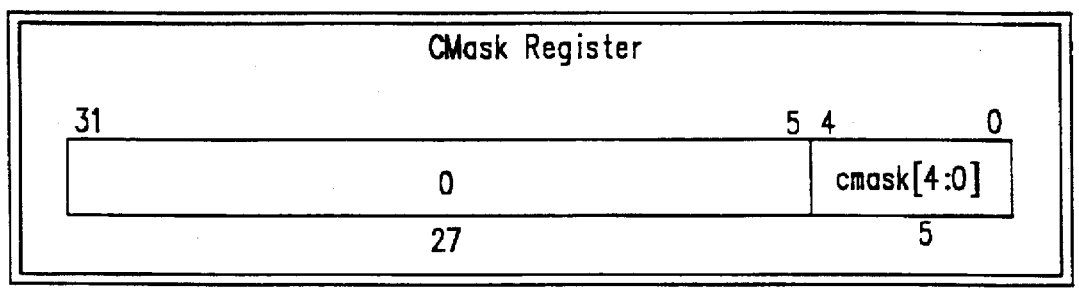

The Circular Mask (CMask) Register is utilized by new SCobra instruction set extensions. The Load/Store word/halfword/byte with update circular instructions store a value into the destination register, and update the base address register with the addition of base+offset, modified according to this 5-bit value. This feature is important in DSP and other applications that use circular buffers. FIG. 31 shows the format of the Cmask register.

Note: even though this register resides within CP0, user-mode access will always be granted regardless of the value contained in Status [Cu0].

The Error Exception Program Counter (Error EPC) register is similar to the EPC. It is used to store the PC on cold reset, warm reset, and NMI exceptions. The read/write Error EPC register contains the virtual address at which instruction processing can resume after servicing the interrupt. The address may be either:

the virtual address of the first instruction terminated by the exception, or the virtual address of the immediately preceding branch or jump instruction when the terminated instruction is in a branch delay slot.

Figure 32:
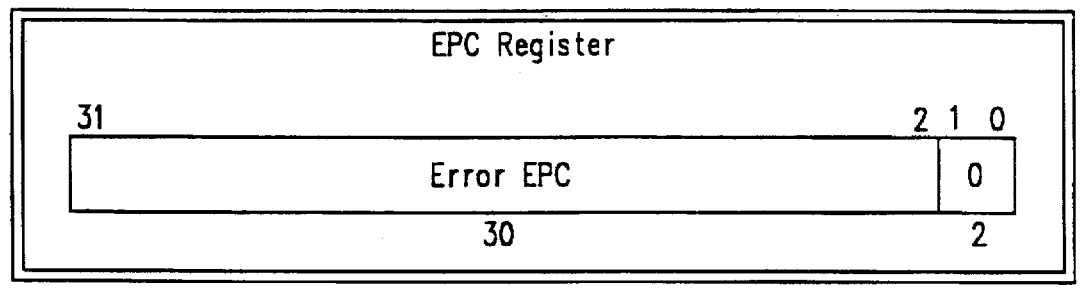

There is no branch delay slot indication for the Error EPC register. FIG. 32 shows the format of the Error EPC register.

Exception Operation—To handle an exception—the processor, saves the current operating state, enters Kernel mode, disables interrupts, and forces execution of a handler at a fixed address. To resume normal operation, the operating state must be restored and interrupts enabled.

When an exception occurs, the EPC register is loaded with the restart location at which execution can resume after servicing the exception. The EPC register contains the address of the instruction associated with the exception, or, if the instruction was executing in a branch delay slot, the EPC register contains the address of the branch instruction immediately preceding.

R4000 Mode Operation: (default after cold reset)

The SCobra processor uses the following mechanisms for saving and restoring the operating mode and interrupt status:

A single interrupt enable bit (IE) located in the Status register.

A base operating mode (Use, Kernel) located in field KSU of the Status register.

An exception level (normal, exception) located in the EXL field of the Status register.

An error level (normal, error) located in the ERL field of the Status register.

Interrupts are enabled by setting the IE bit to 1 and both levels (EXL, ERL) to normal. The current processor operating mode is defined as follows:

| Current Mode | Status <KSU> | Status <EXL> | Status <ERL> |
| --- | --- | --- | --- |
| User | 10 | 0 | 0 |
| Kernel | 00 | 1 | 0 |
| Kernel | xx | 1 | 0 |
| Kernel | xx | 0 | 1 |

Exceptions set the exception level to exception (EXL=1). The exception handler typically resets to normal (EXL=0) after saving the appropriate state, and then sets it back to exception while restoring that state restarting. Returning from an exception (ERET instruction) resets the exception level to normal.

R3000 Mode Operation: This mode of operation is much simpler. The current processor operating state is always defined by the KUc bit (0≧Kernel, 1≧User). The basic mechanism for saving and restoring the operating state of the processor is the Kernel/User (KU) and Interrupt Enable (IE) stack located in the bottom 6 bits of the Status register.

When responding to an exception, the current mode bits (KUc/IEc) are saved into the previous mode bits (KUp/IEp). The previous mode bits are saved into the old mode bits (KUo/EIo). The current mode bits (KUc/IEc) are both cleared to zero.

After exception processing has completed, the saved state is restored through the use of the RFE instruction. This causes the previous mode bits to be copied back into the current mode bits and the old mode bits to be copied back into the previous mode bits. The old mode bits are left unchanged.

Figure 33:
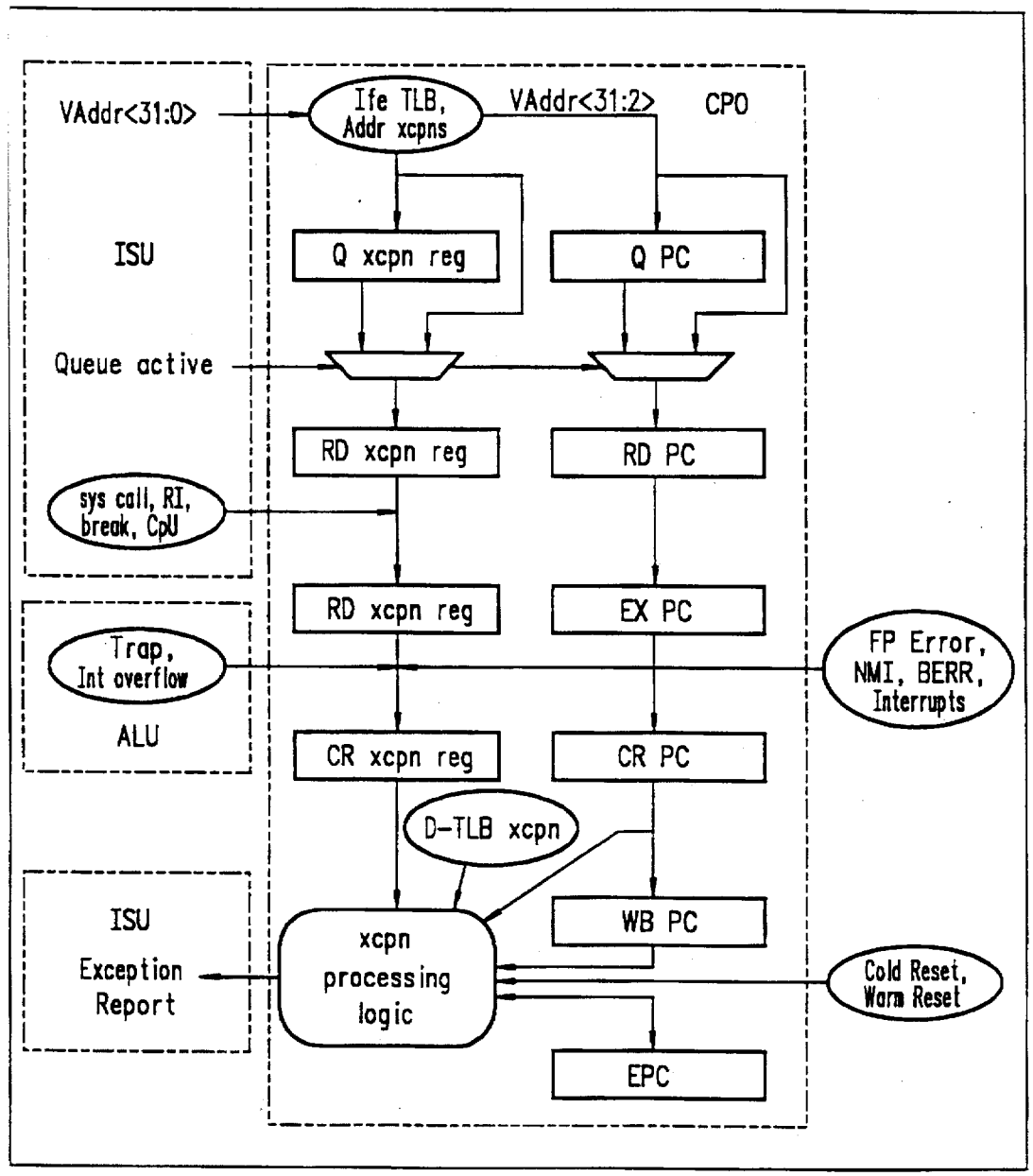
FIG. 33 illustrates the CP0 exception pipeline.

FIG. 33 depicts the CP0 exception pipeline. As exceptions are reported to CP0, they are checked for masking conditions. If none exist, the exception is added to the exception vector being piped with the offending instruction. The Program Counter (PC) value is needed for loading into the EPC register when the exception is presented (CR-cycle).

Instruction Set Summary—Following is an overview of the MIPS R-series instructions and instruction set extensions supported in this processor.

Instruction Set Formats—Every R-Series instruction consists of a single word 32(bits) aligned on a word boundary. As shown in FIG. 34, there are three instruction formats: I-type (immediate), J-type (jump), and R-type (register). This restricted format approach simplifies instruction decoding. More complicated (and less frequently used) operations and addressing modes can be synthesized by the compiler and assembler.

Load and Store Instructions—Load and Store instructions move data between memory and general registers. They are all i-type instructions. The only addressing mode directly supported in the base R-Series architecture is base register plus 16-bit signed immediate offset.

The mips2 extensions, starting with the R6000 processor, adds the Load-Linked and Store-Conditional instructions which are used to support multiple processors, and the SYNC instruction which is used to synchronize loads and stores. CW4010 supports these instructions also.

The load/store instruction operation code (opcode) determines the access type, which in turn indicates the size of the data item to be loaded or stored. Regardless of access type or byte-numbering order (endianness), the address specifies the byte that has the smallest byte address of all the bytes in the addressed field. For a big-endian machine, this is the leftmost byte; for a little-endian machine, this is the rightmost byte.

The bytes that are used within the addressed word can be determined directly from the access type and the two low-order bits of the address, as shown in FIG. 25. Note that certain combinations of access type and low-order address bits can never occur; only the combinations shown in FIG. 35 are permissible.

| Instruction | Format and Description |
|---|---|
| LOAD AND STORE INSTRUCTION SUMMARY | |
| Load Byte | LB rt, offset (base) |
| | Sign-extend 16-bit offset and add to contents of register base to form address. Sign-extend contents of addressed byte and load into rt. |
| Load Byte Unsigned | LBU rt, offset(base) |
| | Sign-extend 16-bit offset and add to contents of register base to form address. Zero-extend contents of addressed byte and load into rt. |
| Load Halfword | LH rt, offset(base) |
| | Sign-extend 16-bit offset and add to contents of register base to form address. Sign-extend contents of addressed halfword and load into rt. |
| Load Halfword Unsigned | LHU rt, offset(base) |
| | Sign-extend 16-bit offset and add to contents of register base to form address. Zero-extend contents of addressed halfword and load into rt. |
| Load Word | LW rt, offset(base) |
| | Sign-extend 16-bit offset and add to contents of register base to form address, and load the addressed word into rt. |
| Load Word Left | LWL rt, offset(base) |
| | Sign-extend 16-bit offset and add to contents of register base to form address. Shift addressed word left so that addressed byte is leftmost byte of a word. Merge bytes from memory with contents of register rt and load result into register rt. |
| Load Word Right | LWR rt,offset(base) |
| | Sign-extend 16-bit offset and add to contents of register base to form address. Shift addressed word right so that addressed byte is rightmost byte of a word. Merge bytes from memory with contents of register rt and load result into register rt. |
| Store Byte | SB rt, offset(base) |
| | Sign-extend 16-bit offset and add to contents of register base to form address. Store least-significant byte of register rt at addressed location. |
| Store Halfword | SH rt, offset(base) |
| | Sign-extend 16-bit offset and add to contents of register base to form address. Store least-significant halfword of register rt at addressed location. |
| Store Word | SW rt, offset(base) |
| | Sign-extend 16-bit offset and add to contents of register base to form address. Store contents of register rt at addressed location. |
| Store Word Left | SWL rt, offset(base) |
| | Sign-extend 16-bit offset and add to contents of register base to form address. Shift contents of register rt right so that the left most byte of the word is in the position of the addressed byte. Store word containing shifted bytes into word at addressed byte. |
| Store Word Right | SWR rt, offset(base) |
| | Sign-extend 16-bit offset and add to contents of register base to form address. Shift contents of register rt left so that the rightmost byte of the word is in the position of the addressed byte. Store word containing shifted bytes into word at addressed byte. |
| LOAD AND STORE INSTRUCTION SUMMARY (MIPS2 ISA EXTENSIONS) | |
| Load Linked | LL rt, offset(base) |
| | Sign-extend 16-bit offset and add to contents of register Base to form address. Sign-extend contents of addressed word and load into register rt. |
| Store Conditional | SC rt, offset(base) |
| | Sign-extend 16-bit offset and add to contents of register Base to form address. Conditionally store low-order word of register rt at address, based on whether the load-link has been 'broken'. |
| Sync | SYNC |
| | Complete all outstanding load and store instructions before allowing any new load or store instruction to start. |

COMPUTATIONAL INSTRUCTIONS—Computational instructions perform arithmetic, logical, and shift operations on values in registers. They occur in both R-type (both operands are registers) and I-type (one operand is a 16-bit immediate) formats. There are four categories of computational instructions (summarized in the following tables):

ALU Immediate instructions

3-Operand, Register-Type instructions

Shift instructions

Multiply/Divide instructions

Computational CW4010 instruction extensions

| Instruction | Format and Description |
|---|---|
| ALU IMMEDIATE INSTRUCTION SUMMARY | |
| Add Immediate | ADDI rt, rs, immediate<br>Add 16-bit, sign-extended immediate to register rs and place 32-bit result in register rt. Trap on two's complement overflow. |
| Add Immediate Unsigned | ADDIU rt, rs, immediate<br>Add 16-bit, sign-extended immediate to register rs and place 32-bit result in register rt. Do not trap on overflow. |
| Set on Less Than Immediate | SLTI rt, rs, immediate<br>Compare 16-bit, sign-extended immediate with register rs as unsigned 32-bit integers. Result = 1 if rs is less than immediate; otherwise result = 0. Place result in register rt. |
| Set on Less Than Immediate Unsigned | SLTIU rt, rs, immediate<br>Compare 16-bit, sign-extended immediate with register rs as unsigned 32-bit integers. Result = 1 if rs is less than immediate; otherwise result = 0. Place result in register rt. |
| AND Immediate | ANDI rt, rs, immediate<br>Zero-extend 16-bit immediate, AND with contents of register rs, and place result in register rt. |
| OR Immediate | ORI rt, rs, immediate<br>Zero-extend 16-bit immediate, OR with contents of register rs, and place result in register rt. |
| Exclusive OR Immediate | XORI rt, rs immediate<br>Zero-extend 16-bit immediate, exclusive OR with contents of register rs, and place result in register rt. |
| Load Upper immediate | LUI rt, immediate<br>Shift 16-bit immediate left 16 bits. Set least-significant 16 bits of word to zeros. Store result in register rt. |
| 3-OPERAND, REGISTER-TYPE INSTRUCTION SUMMARY | |
| Add | ADD rd, rs, rt<br>Add contents of registers rs and rt and place 32-bit result in register rd. Trap on two's complement overflow. |
| Add Unsigned | ADDU rd, rs, rt<br>Add contents of registers rs and rt and place 32-bit result in register rd. Do not trap on overflow. |
| Subtract | SUB rd, rs, rt<br>Subtract contents of registers rt from rs and place 32-bit result in register rd. Trap on two's complement overflow. |
| Subtract Unsigned | SUBU rd, rs, rt<br>Subtract contents of registers rt from rs and place 32-bit result in register rd. Do not trap on overflow. |
| Set on Less Than | SLT rd, rs, rt<br>Compare contents of register rt to register rs (as signed, 32-bit integers). If register rs is less than rt, rd =1; otherwise, rd = 0. |
| Set on Less Than Unsigned | SLTU rd, rs, rt<br>Compare contents of register rt to register rs (as unsigned, 32-bit integers). If register rs is less than rt, rd = 1; otherwise, rd = 0. |
| AND | AND rd, rs, rt<br>Bitwise AND contents of registers rs and rt and place result in register rd. |
| OR | OR rd, rs, rt<br>Bitwise OR contents of registers rs and rt and place result in register rd. |
| Exclusiver OR | XOR rd, rs, rt<br>Bitwise exclusive OR contents of registers rs and rt and place result in register rd. |
| NOR | NOR rd, rs, rt<br>Bitwise NOR contents of registers rs and rt and place result in register rd. |
| SHIFT INSTRUCTION SUMMARY | |
| Shift Left Logical | SLL rd, rt, shamt<br>Shift contents of register rt left by shamt bits, inserting zeros into low-order bits. Place 32-bit result in register rd. |
| Shift Right Logical | SRL rd, rt shamt<br>Shift contents of register rt right by shamt bits, inserting zeros into high-order bits. Place 32-bit result in register rd. |
| Shift Right Arithmetic | SRA, rd, rt, shamt<br>Shift contents of register rt right by shamt bits, sign-extending the high-order bits. Place 32-bit result in register rd. |
| Shift Left Logical Variable | SLLV rd, rt, rs<br>Shift contents of register rt left. Low-order 5 bits of register rs specify the number of bits to shift. Insert zeros into low-order bits of rt and place 32-bit result in register rd. |
| Shift Right Logical Variable | SRLV rd, rt, rs<br>Shift contents of register rt right. Low-order 5 bits of register rs specify the number of bits to shift. Insert zeros into high-order bits of rt and place 32-bit result in register rd. |
| Shift Right Arithmetic Variable | SRAV rd, rt, rs<br>Shift contents of register rt right. Low-order 5 bits of register rs specify the number of bits to shift. Sign-extend the high-order bits of rt and place 32-bit result in register rd. |
| MULTIPLY/DIVIDE INSTRUCTION SUMMARY | |
| Multiply | MULT rs, rt<br>Multiply contents of registers rs and rt as two's complement values. Place 64-bit results in special registers HI and LO. |
| Multiply Unsigned | MULTU rs, rt<br>Multiply contents of registers rs and rt as two's complement values. Place 64-bit results in special registers HI and Lo. |
| Divide | DIV rs, rt<br>Divide contents of registers rs and rt as unsigned values. Place 32-bit quotient in special register LO and 32-bit remainder in HI. |
| Divide Unsigned | DIVU rs, rt<br>Divide contents of registers rs and rt as unsigned values. Place 32-bit quotient in special register LO and 32-bit remainder in HI. |
| Move From HI | MFHI rd<br>Move contents of special register HI to register rd. |
| Move From LO | MFLO rd<br>Move contents of special register LO to register rd. |
| Move to HI | MTHI rd<br>Move contents of register rd to special register HI. |
| Move to LO | MTLO rd<br>Move contents of register rd to special register LO. |
| EXTENSIONS SUMMARY (CW4010 ISA EXTENSIONS) | |
| Add Circular Immediate | ADDCIU rt, rs, immediate<br>The 16-bit immediate is sign extended and added to the contents of general register rs, with the result masked by the value in CP0 register CMASK according to the formula: rt = (rs & !EXP(CMASK)) \| ((rt + immed) & EXP(CMASK)). |
| Find First Set | FFS rt, rs |

| Instruction | Format and Description |
|---|---|
| | -continued |
| | Starting at the most significant bit in register rs, find the first bit which is set to a one, and return the bit number in register rt. If no bit is set, return with bit 31 of rt set to 1. |
| Find First Clear | FFC rt, rs<br>Starting at the most significant bit in register rs, find the first bit which is set to a zero, and return the bit number in register rt. If no bit is set, return with bit 31 of rt set to 1. |
| Select and Shift Right | SELSR rd, rs, rt<br>Using register rs and rd as a 64-bit register pair, and CP0 register ROTATE as the shift count, shift the register pair rs‖rt right the number of bits specified in ROTATE, and place the least significant 32-bit value in result register rd. |
| Select and Shift Left | SELSL rd, rs, rt<br>Using register rs and rd as a 64-bit register pair, and CP0 register ROTATE as the shift count, shift the register pair rs‖rt left the number of bits specified in ROTATE, and place the most significant 32-bit value in result register rd. |
| COMPUTATION INSTRUCTION EXTENSIONS SUMMARY (CW4010 ISA EXTENSIONS) | |
| Minimum (RevB) | MIN rd, rs, rt<br>The source operand rs and rt are compared as 2's complement values. Smaller value is stored into rd register. |
| Maximum (RevB) | MAX rd, rs, rt<br>The source operand rs and rt are compared as 2's complement values. Larger value is stored in to rd register. |
| Multiply/Add | MADD rs, rt<br>Multiply contents of registers rs and rt as complement values. Add 64-bit results to contents in special register pair HI/LO, and place results in HI and LO. |
| Multiply/Add Unsigned | MADDU rs, rt<br>Multiply contents of registers rs and rt as unsigned values. Add 64-bit results to contents in special register pair HI/LO, and place results in HI and LO. |
| Multiply/Subtract | MSUB rs, rt<br>Multiply contents of registers rs and rt as two's complement values. Subtract 64-bit results from contents in special register pair HI/LO, and place results in HI and LO. |
| Multiply/Subtract Unsigned | MSUBU rs, rt<br>Multiply contents of registers rs and rt as unsigned values. Subtract 64-bit results from contents in special register pair HI/LO, and place results in HI and LO. |

The execution time of the multiply/divide/accumulate type instructions is as follows:

| Operation | R3000 | CW33300 | R4000 | CW4010 High Speed | CW4010 Basic |
|---|---|---|---|---|---|
| multiply | 12 | 1 + (bits/3) | 10 | 3 | 1 + (bits/2) |
| multiply/add | na | na | na | 3 | 1 + (bits/2) |
| divide | 34 | 34 | 69 | 34/17 | 35 |

Note that for H.S. CW4010 mult/add instructions, while the latency is 3 cycles, the instructions can be pipelined for a throughput of one every 2 cycles. This will accelerate calculations such as dot products and FIR filters which do a series of mult/adds to compute a single result. The divide time is shortened to 17 cycles if the divisor has less than 16 significant bits.

JUMP AND BRANCH INSTRUCTIONS—Jump and Branch instructions change the control flow of a program. For mips1 jump and branch instructions always occur with a one-instruction delay. That is, the instruction immediately following the jump or branch is always executed while the target instruction is being fetched from storage.

There may be additional cycle penalties depending on circumstances and implementation, but these are interlocked in hardware. The mips2 ISA extensions add the branch likely class of instructions which operate exactly like their non-likely counterparts, except that when the branch is not taken, the instruction following the branch is cancelled.

The J-type instruction format is used for both jump and jump-and-link instructions for subroutine calls. In this format, the 26-bit target address is shifted left two bits and combined with the 4 high-order bits of the current program counter to form a 32-bit absolute address.

The R-type instruction format, which takes a 32-bit byte address contained in a register, is used for returns, dispatches, and cross-page jumps.

Branches have 16-bit signed offsets relative to the program counter (I-type). Jump-and-link and branch-and-link instructions save a return address in register 31.

The following tables summarize the R-Series jump instructions the branch instructions, and the branch-likely instructions.

| Instruction | Format and Description |
|---|---|
| | JUMP INSTRUCTION SUMMARY |
| Jump | J target<br>Shift 26-bit target address left two bits, combine with four high-order bits of PC, and jump to address with a one-instruction delay. |
| Jump and Link | JAL target<br>Shift 26-bit target address left two bits, combine with four high-order bits of PC, and jump to address with a one-instruction delay. Place address of instruction following delay slot in r31 (link register). |
| Jump Register | JR rs<br>Jump to address contained in register rs with a one-instruction delay. |
| Jump and Link Register | JALR rs, rd<br>Jump to address contained in register rs with a one-instruction delay. Place address of instruction following delay slot in rd. |
| | BRANCH INSTRUCTION SUMMARY |
| Branch on Equal | BEQ rs, rt, offset<br>Branch to target address[1] if register rs is equal to register rt. |
| Branch on Not Equal | BNE rs, rt, offset<br>Branch to target address if register rs does not equal register rt. |
| Branch on Less than or Equal to Zero | BLEZ rs, offset<br>Branch to target address if register rs is less than or equal to 0. |
| Branch on Greater Than Zero | BGTZ rs, offset<br>Branch to target address if register rs is greater than 0. |
| Branch on Less Than Zero | BLTZ rs, offset<br>Branch to target address if register rs is less than 0. |
| Branch on Greater Than or Equal to Zero | BGEZ rs, offset<br>Branch to target address if register rs is greater than or equal to 0. |
| Branch on Less Than | BLTZAL rs, offset |

| Instruction | Format and Description |
|---|---|
| Zero And Link | Place address of instruction following delay slot in register r31 (link register). Branch to target address if register rs is less than 0. |
| Branch on Greater Than or Equal to Zero and Link | BGEZAL rs, offset<br>Place address of instruction following delay slot in register r31 (link register). Branch to target address if register rs is greater than or equal to ). |

BRANCH-LIKELY INSTRUCTION SUMMARY (mips2 ISA Extensions)

| Instruction | Format and Description |
|---|---|
| Branch on Equal Likely | BEQL rs, rt, offset<br>Branch to target address[2] if register rs is equal to register rt. |
| Branch on Not Equal Likely | BNEL rs, rt, offset<br>Branch to target address if register rs does not equal register rt. |
| Branch on Less Than or Equal to Zero Likely | BLEZL rs, offset<br>Branch to target address if register rs is less than or equal to 0. |
| Branch on Greater Than Zero Likely | BGTZL rs, offset<br>Branch to target address if register rs is greater than 0. |
| Branch on Less Than Zero Likely | BLTZL rs, offset<br>Branch to target address if register rs is less than 0. |
| Branch on Greater Than or Equal to Zero Likely | BGEZL rs, offset<br>Branch to target address if register rs is greater than or equal to 0. |
| Branch on Less Than Zero And Link Likely | BLTZALL rs, offset<br>Place address of instruction following delay slot in register r31 (link register). Branch to target address if register rs is less than 0. |
| Branch on Greater Than or Equal to Zero and Link Likely | BGEZALL rs, offset<br>Place address of instruction following delay slot in register r31 (link register). Branch to target address if register rs is greater than or equal to 0. |

[1]All branch-instruction target addresses are computed as follows: add address of instruction in delay slot and the 16-bit offset (shifted left two bits and sign-extended to 32 bits). All branches occur with a delay of one instruction.
[2]All branch-instruction target addresses are computed as follows: add address of instruction in delay slot and the 16-bit offset (shifted left two bits and sign-extended to 32 bits). All branches occur with a delay of one instruction.

TRAP INSTRUCTIONS—The trap instructions are part of the mips2 instructions. They provide a set of instructions which conditionally create an exception, based on the same conditions tested in the branch instructions.

TRAP INSTRUCTION SUMMARY (mips2 ISA Extensions)

| Instruction | Format and Description |
|---|---|
| Trap on Equal | TEQ rs, rt<br>Trap if register rs is equal to register rt. |
| Trap on Equal Immediate | TEQI rs, immediate<br>Trap if register rs is equal to the immediate value. |
| Trap on Greater Than or Equal | TGE rs, rt<br>Trap if register rs is greater than or equal to register rt. |
| Trap on Greater Than or Equal Immediate | TGEI rs, immediate<br>Trap if register rs is greater than or equal to the immediate value. |
| Trap on Greater Than or Equal Unsigned | TGEU rs, rt<br>Trap if register rs is greater than or equal to register rt. |
| Trap on Greater Than or Equal Immediate Unsigned | TGEIU rs, immediate<br>Trap if register rs is greater than or equal to the immediate value. |

TRAP INSTRUCTION SUMMARY (mips2 ISA Extensions)

| Instruction | Format and Description |
|---|---|
| Trap on Less Than | TLT rs, rt<br>Trap if register rs is less than register rt. |
| Trap on Less Than Immediate | TLTI rs, immediate<br>Trap if register rs is less than the immediate value. |
| Trap on Less Than Unsigned | TLTU rs, rt<br>Trap if register rs is less than the register rt. |
| Trap on Less Than Immediate Unsigned | TLTIU rs, immediate<br>Trap if register rs is less than the immediate value. |
| Trap If Not Equal | TNE rs, rt<br>Trap if register rs is not equal to rt. |
| Trap If Not Equal Immediate | TNEI rs, immediate<br>Trap if register rs is not equal the immediate value. |

SPECIAL INSTRUCTIONS—Special instructions cause an unconditional branch to the general exception-handling vector. Special instructions are always R-type. The following table summarizes these instructions.

SPECIAL INSTRUCTION SUMMARY

| Instruction | Format and Description |
|---|---|
| System Call | SYSCALL<br>Initiates system call trap, immediately transferring control to exception handler. |
| Breakpoint | BREAK<br>Initiates breakpoint trap, immediately transferring control to exception handler. |

COPROCESSOR INSTRUCTIONS—The CW4010 does support external (on-chip) coprocessors and implements the Coprocessor instruction set. Coprocessor branch instructions are J-type. The following table summarizes the different coprocessor instructions.

COPROCESSOR INSTRUCTION SUMMARY

| Instruction | Format and Description |
|---|---|
| Load Word to Coprocessor | LWCz rt, offset(base) |
| Store Word from Coprocessor | SWCz rt, offset(base) |
| Move to Coprocessor | MTCz rt, rd |
| Move from Coprocessor | MFCz rt, rd |
| Move Control to Coprocessor | CTCz rt, rd |
| Move Control From Coprocessor | CFCz rt, rd |
| Coprocessor Operation | COPz cofun |
| Branch on Coprocessor z True (Likely) | BCzT offset, (BCzTL offset)<br>Computer a branch target address by adding address of instruction to the 16-bit offset (shifted left two bits and sign-extended to 32 bits). Branch to the target address (with a delay of one instruction) if coprocessor z's condition line is true. In the case of Branch Likely, the delay slot instruction is not executed when the branch is untaken. |
| Branch on Coprocessor z False | BCzF offset, (BCzFL offset)<br>Computer a branch target address by adding |

COPROCESSOR INSTRUCTION SUMMARY

| Instruction | Format and Description |
|---|---|
| (Likely) | address of instruction to the 16-bit offset (shifted left two bits and sign-extended to 32 bits). Branch to the target address (with a delay of one instruction) if coprocessor z's condition line is false. In the case of Branch Likely, the delay slot instruction is not executed when the branch is untaken. |

SYSTEM CONTROL COPROCESSOR (CP0) INSTRUCTIONS—Coprocessor 0 instructions perform operations on the system control coprocessor (CP0) registers to manipulate the memory management and exception-handling facilities of the processor. The following table summarizes the CP0 instructions.

CP0 INSTRUCTION SUMMARY

| Instruction | Format and Description |
|---|---|
| Move to CP0 | MTC0 rt, rd<br>Load contents of CPU register rt into CP0 register rd. |
| Move From CP0 | MFC0 rt, rd<br>Load contents of CP0 register rd into CPU register rt. |
| Read Indexed TLB Entry | TLBR<br>Load EntryHi and EntryLo with the TLB entry pointed to by the Index register. |
| Write Indexed TLB Entry | TLBWI<br>Load TLB entry pointed to by the Index register with the contents of the EntryHi and EntryLo registers. |
| Write Random TLB Entry | TLBWR<br>Load TLB entry pointed to the Random register with the contents of the EntryHi and EntryLo registers. |
| Probe TLB for Matching | TLBP<br>Load the Index register with the address of the TLB entry whose contents match the EntryHi and EntryLo registers. If no TLB entry matches, set the high-order bit of the Index register. |
| Exception Return | ERET<br>Lad the PC from ErrorEPC(SR2=1:Error Exception) or EPC(SR2=0:Exception) and clear ERL bit (SR2=1) or EXL bit (SR2=0) in the Status Register. SR2 is Status register bit[2]. |

CP0 INSTRUCTION CW4010 EXTENSIONS

| Instruction | Format and Description |
|---|---|
| Waiti | Wait for Interrupt<br>Stops execution of instruction and places the processor into a power save condition until a hardware interrupt, NMI, or reset is received. |

CACHE MAINTENANCE INSTRUCTIONS—Cache Maintenance instructions are always I-type. The following table summarizes these instructions.

JUMP INSTRUCTION SUMMARY

| Instruction | Format and Description |
|---|---|
| Flush Icache | FLUSHI<br>Flush Icache. 256 stall cycles will be needed. |
| Flush Dcache | FLUSHD<br>Flush Dcache. 256 stall cycles will be needed. |
| Flush Icache & Dcache | FLUSHID<br>Flush both I and Dcache in 256 stall cycles. |
| WriteBack | WB offset(base)<br>Write back a Dcache line addressed by offset+GPR[base]. |

There has been described a preferred embodiment of a superscalar RISC CPU core and processing system. While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. A microprocessor comprising
   a bus interface unit for interfacing with an external memory and other system components for the flow of instructions and data,
   an instruction scheduling unit coupled to said bus interface unit for receiving and decoding program instructions, said instruction unit including a queuing stage for facilitating conditional branch operations;
   a register file including a plurality of general purpose registers for receiving operands from said instruction scheduling unit and providing operands to execution units,
   a data cache,
   a write buffer, and
   a plurality of execution units,
   all of said units operating in a dual pipeline configuration for concurrent fetching of two instructions from a single instruction stream.

2. The microprocessor as defined by claim 1 wherein said plurality of execution units includes:
   a load/store/add unit for managing loads and stores of data with said bus interface unit through said data cache and said write buffer,
   an arithmetic logic unit for performing arithmetic and logic operations on data,
   a multiplier/shift unit for performing multiply and divide operations on data,
   a branch unit for managing the flow of instructions and data for branch and jump instructions, and
   a coprocessor interface for the attachment of special purpose processing units.

3. The microprocessor as defined by claim 2 and further including a coprocessor interconnected to said coprocessor interface, said coprocessor handling exceptions.

4. The microprocessor as defined by claim 3 wherein said coprocessor includes a plurality of registers and a multiple entry translation lookaside buffer, and an exception program counter, when an exception is detected said coprocessor loading said exception program counter with a restart address where execution can resume after the exception is serviced, said plurality of registers being used during exception processing.

5. The microprocessor as defined by claim 4 wherein one of said plurality of registers is a circular mask register which is used by said coprocessor in executing an Add with Circular Mask instruction in which an immediate field of an instruction is sign-extended and added to the contents of a general register, the result being masked with the extended value in said circular mask register.

6. The microprocessor as defined by claim 3 wherein said coprocessor operates in multiple exception modes for compatibility with a mips R4000 exception and a mips R3000 exception.

7. The microprocessor as defined by claim 2 wherein said arithmetic logic unit includes an arithmetic/logic and trap unit, a shifter unit, and a branch and trap unit.

8. The microprocessor as defined by claim 1 wherein said instruction scheduling unit further includes an instruction cache unit, an instruction decoder, an instruction address unit, and a master pipeline control, instructions not causing a branch or register conflict bypassing said queuing stage.

9. The microprocessor as defined by claim 8 wherein said instruction cache unit is active for each instruction fetch cycle and informs said master pipeline control and said register file when an instruction is missing, said instruction address unit provides instruction cache addresses and a delay slot sequential address added to an offset to accommodate conditional branches, said master pipeline control monitoring control signals from said register file and providing strobe signals to the other units of the instruction scheduling unit.

10. The microprocessor as defined by claim 9 wherein said register file interfaces with said queuing stage and a decode/read stage and determines whether instructions can be issued, resolves resource conflicts due to data and structural conflicts, and broadcasts control signals to regulate an arithmetic/logic unit.

11. The microprocessor as defined by claim 1 and further including a cache invalidation interface.

12. The microprocessor as defined by claim 1 wherein said dual pipeline configuration for concurrent fetching of two instructions includes an instruction fetch stage, a conditional queuing stage, a decode/read stage, an execution stage, a cache read stage for load and store instructions, and a write back stage for writing execution results into said register file.

* * * * *